United States Patent
Matsuda et al.

(10) Patent No.: US 11,856,323 B2
(45) Date of Patent: Dec. 26, 2023

(54) VIDEO DISPLAY DEVICE AND CONTROL METHOD

(71) Applicant: MAXELL, LTD., Kyoto (JP)

(72) Inventors: Takahiro Matsuda, Tokyo (JP); Satoshi Ouchi, Tokyo (JP); Yoshiho Seo, Tokyo (JP); Seiji Murata, Tokyo (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 16/546,612

(22) Filed: Aug. 21, 2019

(65) Prior Publication Data
US 2019/0379860 A1  Dec. 12, 2019

Related U.S. Application Data
(62) Division of application No. 15/579,295, filed as application No. PCT/JP2015/066383 on Jun. 5, 2015, now abandoned.

(51) Int. Cl.
*H04N 7/01* (2006.01)
*G06F 3/147* (2006.01)
(Continued)

(52) U.S. Cl.
CPC ....... *H04N 7/0132* (2013.01); *G02B 27/0172* (2013.01); *G06F 3/147* (2013.01);
(Continued)

(58) Field of Classification Search
CPC .. H04N 7/0132; H04N 9/3111; H04N 9/3182; H04N 9/3194; G02B 27/0172;
(Continued)

(56) References Cited

U.S. PATENT DOCUMENTS
| | | | |
|---|---|---|---|
| 2010/0013739 A1 | 1/2010 | Sako et al. | |
| 2016/0116745 A1* | 4/2016 | Osterhout | G02B 27/0172 |
| | | | 359/614 |

(Continued)

FOREIGN PATENT DOCUMENTS
| | | | | |
|---|---|---|---|---|
| CN | 101506868 A | | 8/2009 | |
| CN | 104798109 | * | 7/2018 | ............. G06T 19/00 |

(Continued)

OTHER PUBLICATIONS
International Search Report of PCT/JP2015/066383 dated Sep. 1, 2015.
(Continued)

*Primary Examiner* — Jeff A Burke
*Assistant Examiner* — Sihar A Karwan
(74) *Attorney, Agent, or Firm* — Mattingly & Malur, PC

(57) ABSTRACT

Provided is a video display device wearable on the head of a user, wherein the video display device includes a video display unit capable of switching two or more display methods, a control unit for indicating a display method to the video display unit, a first detection unit for detecting the motion of the head of a user, a second detection unit for detecting the motion of the point of view of the user, and a motion determination unit for determining the motion state of the device user by using the output from the first detection unit and the output from the second detection unit. The control unit indicates a change of display methods to the video display unit in accordance with the determination result of the motion determination unit.

12 Claims, 24 Drawing Sheets

(51) Int. Cl.
*G09G 3/34* (2006.01)
*G09G 3/00* (2006.01)
*H04N 9/31* (2006.01)
*G02B 27/01* (2006.01)

(52) U.S. Cl.
CPC .......... *G09G 3/001* (2013.01); *G09G 3/3413* (2013.01); *H04N 9/3111* (2013.01); *H04N 9/3182* (2013.01); *H04N 9/3194* (2013.01); *G02B 2027/014* (2013.01); *G02B 2027/0118* (2013.01); *G02B 2027/0138* (2013.01); *G02B 2027/0187* (2013.01); *G09G 2310/0235* (2013.01); *G09G 2320/0242* (2013.01); *G09G 2320/106* (2013.01); *G09G 2340/0435* (2013.01); *G09G 2360/02* (2013.01); *G09G 2370/16* (2013.01)

(58) Field of Classification Search
CPC .... G02B 2027/0118; G02B 2027/0138; G02B 2027/014; G06F 3/147; G09G 3/3413; G09G 3/001; G09G 2320/0242; G09G 2320/106; G09G 2360/02; G09G 2310/0235; G09G 2340/0435; G09G 2370/16
USPC ........................................................ 348/447
See application file for complete search history.

(56) References Cited

U.S. PATENT DOCUMENTS

2016/0266386 A1* 9/2016 Scott .................... G06T 19/006
2017/0287222 A1* 10/2017 Fujimaki ............... G06T 19/006

FOREIGN PATENT DOCUMENTS

| JP | 02-64513 A | 3/1990 |
| JP | 04-138432 A | 5/1992 |
| JP | 05-215960 A | 8/1993 |
| JP | 06-34873 A | 2/1994 |
| JP | 07-148114 A | 6/1995 |
| JP | 2007-101618 A | 4/2007 |
| JP | 2007-114579 A | 5/2007 |
| JP | 2012-203128 A | 10/2012 |
| JP | 5228305 B2 | 7/2013 |
| JP | 2014-225725 A | 12/2014 |
| JP | 2015-028654 A | 2/2015 |
| WO | 2011/111711 A1 | 9/2011 |
| WO | 2014/050841 A1 | 4/2014 |
| WO | 2014/119395 A1 | 1/2017 |

OTHER PUBLICATIONS

Japanese Office Action received in corresponding Japanese Application No. 2017-521479 dated Nov. 6, 2018.
Chinese Office Action received in corresponding Chinese Application No. 201580080171.2 dated Jan. 6, 2020.

* cited by examiner

FIG. 5

| PATTERN | MOTION DETERMINATION PROCESSING ||| DETERMINATION BY CONTROL UNIT ||||
|---|---|---|---|---|---|---|---|
| | HEAD POSITION | LINE OF SIGHT || DIRECTIONS OF HEAD AND LINE-OF-SIGHT MOVEMENTS | NEED FOR VISIBILITY | NEED FOR CONSIDERATION FOR DISCOMFORT | CONTROL MODE |
| | MOVEMENT X | MOVEMENT Y | VIEWPOINT Z | | | | |
| 1 | STILL (0) | STILL (0) | ON VIDEO (1) | * | YES | NO | (PROCESSING A) |
| 2 | | | OFF VIDEO (0) | * | NO | NO | (PROCESSING B) |
| 3 | | MOVING (1) | ON VIDEO (1) | * | YES | YES | (PROCESSING C) |
| 4 | | | OFF VIDEO (0) | * | NO | YES | (PROCESSING D) |
| 5 | MOVING (1) | STILL (0) | ON VIDEO (1) | * | YES | YES | (PROCESSING C) |
| 6 | | | OFF VIDEO (0) | * | NO | YES | (PROCESSING D) |
| 7 | | MOVING (1) | * | MATCH | NO | YES | (PROCESSING D) |
| 8 | | | ON VIDEO (1) | OPPOSITE | YES | YES | (PROCESSING C) |
| 9 | | | OFF VIDEO (0) | | NO | YES | (PROCESSING D) |

* : DON'T CARE

TIME

VIDEO DISPLAY DEVICE AND CONTROL METHOD

TECHNICAL FIELD

The invention of the present application relates to a video display device which is wearable on the head of a user and displays a video before the eyes of the user, and also to a method of controlling the same.

BACKGROUND ART

User-wearable video display devices are getting lighter in weight and smaller in size and are anticipated to become less cumbersome to device users. Video display devices of such a type is advantageous in its capability of allowing a user to obtain information with both of their hands free, and are thus expected to be used for various purposes.

CITATION LIST

Patent Literature

PATENT LITERATURE 1: JP5,228,305B

For example, as in the above-given patent literature, there have been proposed devices that use a glasses-like or head-wearable mount unit and display and end displaying a video on a display unit placed right before the eyes of the user.

SUMMARY OF INVENTION

Technical Problem

With a wearable video display device, it is hard for the device user to look away from a video, so it is desirable to, while continuing displaying the video, lessen a discomfort that may result from instability in the video, or the like. However, there are cases where it is important to keep displaying a video depending on the purpose of the device, and to end displaying the video at the device's discretion as in the reference literature 1 may work against the device user's interests in such a case.

A conceivable cause for the instability in a video may lie in the display scheme employed by the video display device. For example, in a case of a video display device that employs liquid crystals, the instability may be a flicker on the screen caused by update of video information on the screen, and in a case of a video display device employing a field sequential scheme (color time-division scheme), the instability may be color breakup and the like. With a wearable video display device, the device user may sense such video instabilities as a greater discomfort when moving. Further, a display method employed to reduce instability in a video increases consumption of power in turn.

Solution to Problem

To solve the above problem, a video display device wearable on a head of a user includes a video display unit capable of switching a display method between two or more display methods, a control unit that instructs the video display unit which of the display methods to employ, a first detection unit that detects a movement of the head of the user, a second detection unit that detects a movement of a viewpoint of the user, and a motion determination unit that determines a motional state of the user of the device based on an output from the first detection unit and an output from the second detection unit. The control unit instructs the video display unit to change the display method according to a result of the determination made by the motion determination unit.

Advantageous Effects of Invention

The present invention can achieve, with low power consumption, reduction in a discomfort that the user of a wearable video display device may feel from a video.

The other objectives, characteristics, and advantages of the present invention will become clear from the following descriptions of embodiments of the present invention based on the accompanying drawings.

BRIEF DESCRIPTION OF DRAWINGS

FIG.

FIG. 5 is a table illustrating determination processing performed by a motion determination processing unit 1006.

DESCRIPTION OF EMBODIMENTS

Embodiments of the present invention are described below with reference to the drawings.

Embodiment 1

A description is given of an embodiment of the present invention based on the accompanying drawings.

1. Outline of the Device

Figure 1A:
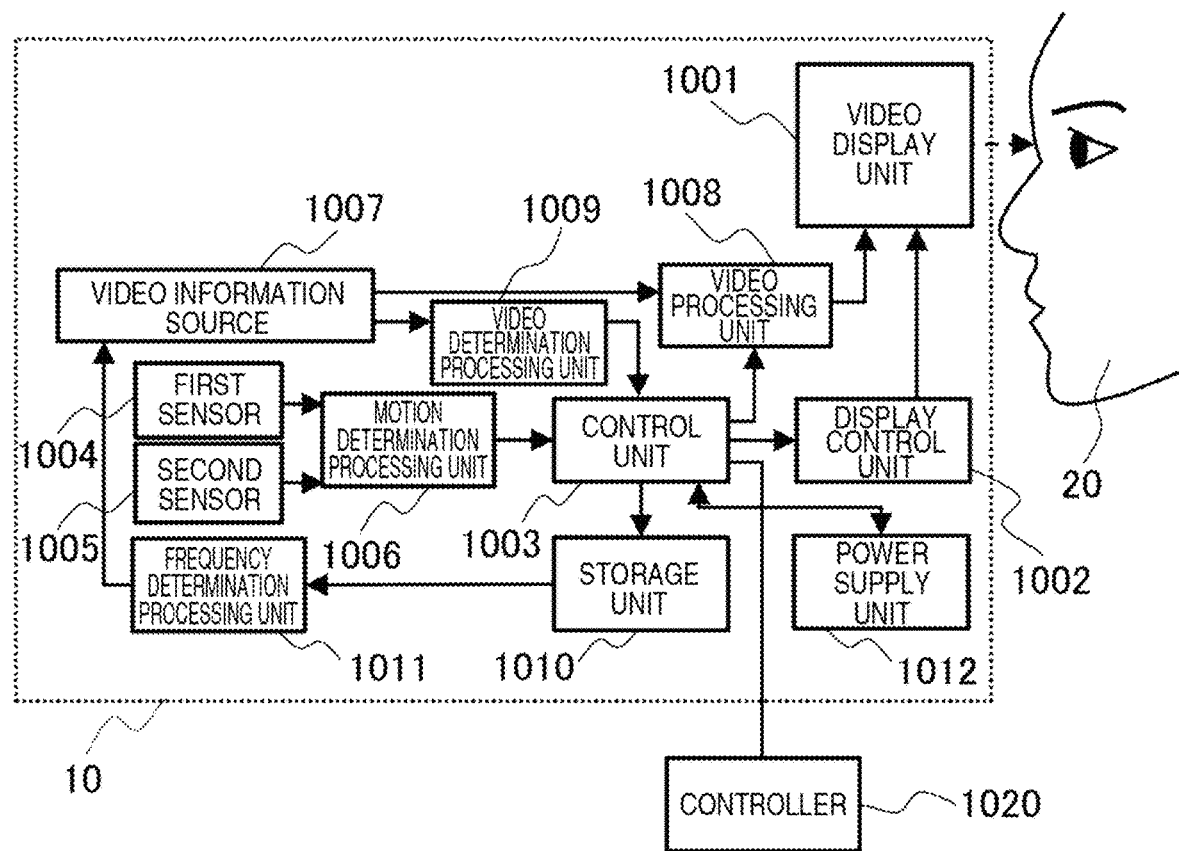
FIG. 1A is a block diagram of a video display device 10 according to Embodiment 1.

FIG. 1A is a block diagram illustrating a video display device which is wearable on a user and displays a video before the eyes of the user.

A video display device 10 includes a video display unit 1001, a display control unit 1002, a control unit 1003, a first sensor 1004, a second sensor 1005, a motion determination processing unit 1006, a video information source 1007, a video processing unit 1008, a video determination processing unit 1009, a storage unit 1010, a frequency determination processing unit 1011, and a power supply unit 1012.

The video display device 10 displays a video by transmitting video information acquired from the video information source 1007 to the video display unit 1001 via the video processing unit 1008. A representative example of the video display unit 1001 is a display using a liquid crystal element or a mirror array element.

The video information source 1007 selects appropriate video information data stored in a storage device (not shown), performs processing such as decryption or cancellation of encryption on the data if necessary, and transmits the video information to 1008. The video information source 1007 may transmit chronological moving images chronologically, or may transmit still images successively.

The control unit 1003 is connected to a controller 1020 outside the video display device 10 in a wired or wireless manner. By operating the controller 1020, a device user 20 can turn on and off the video display device 10 or make various video-related settings. The controller 1020 may be a controller exclusive to the video display device 10, or a smartphone in which a particular application program is installed to enable the smartphone to be used a controller. The power supply unit 1012 is provided with a power on/off switch besides the one on the controller.

The display control unit 1002, the control unit 1003, the motion determination processing unit 1006, the video information source 1007, the video processing unit 1008, the video determination processing unit 1009, and the frequency determination processing unit 1011 are mounted on the video display device 10 as independent pieces of hardware. Alternatively, they may be implemented by one or more arithmetic processors or microprocessors and software or firmware. They may be implemented as a functional block in part of an integrated circuit, or implemented by a programmable logic device such as an FPGA (Field-Programmable Gate Array).

The storage unit 1010 also does not need to be implemented as a separate component, and may be implemented as a functional block in part of the integrated circuit.

Figure 1B:
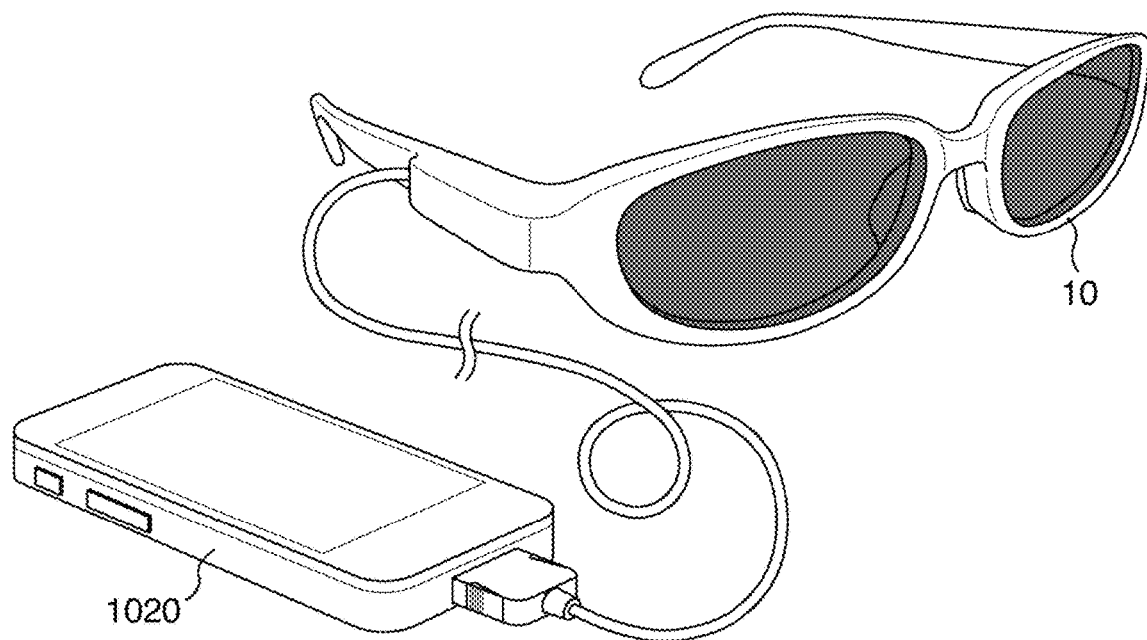
FIG. 1B is a diagram illustrating an example of the outer appearance of the video display device 10.

FIG. 1B is a diagram illustrating an example of the outer appearance of the video display device 10. Main components are housed in the junction between a lens and a temple, and a video is projected onto the lens parts which are half mirrors. The controller 1020 and the main body of the device are connected to each other with a cable.

Figure 1C:
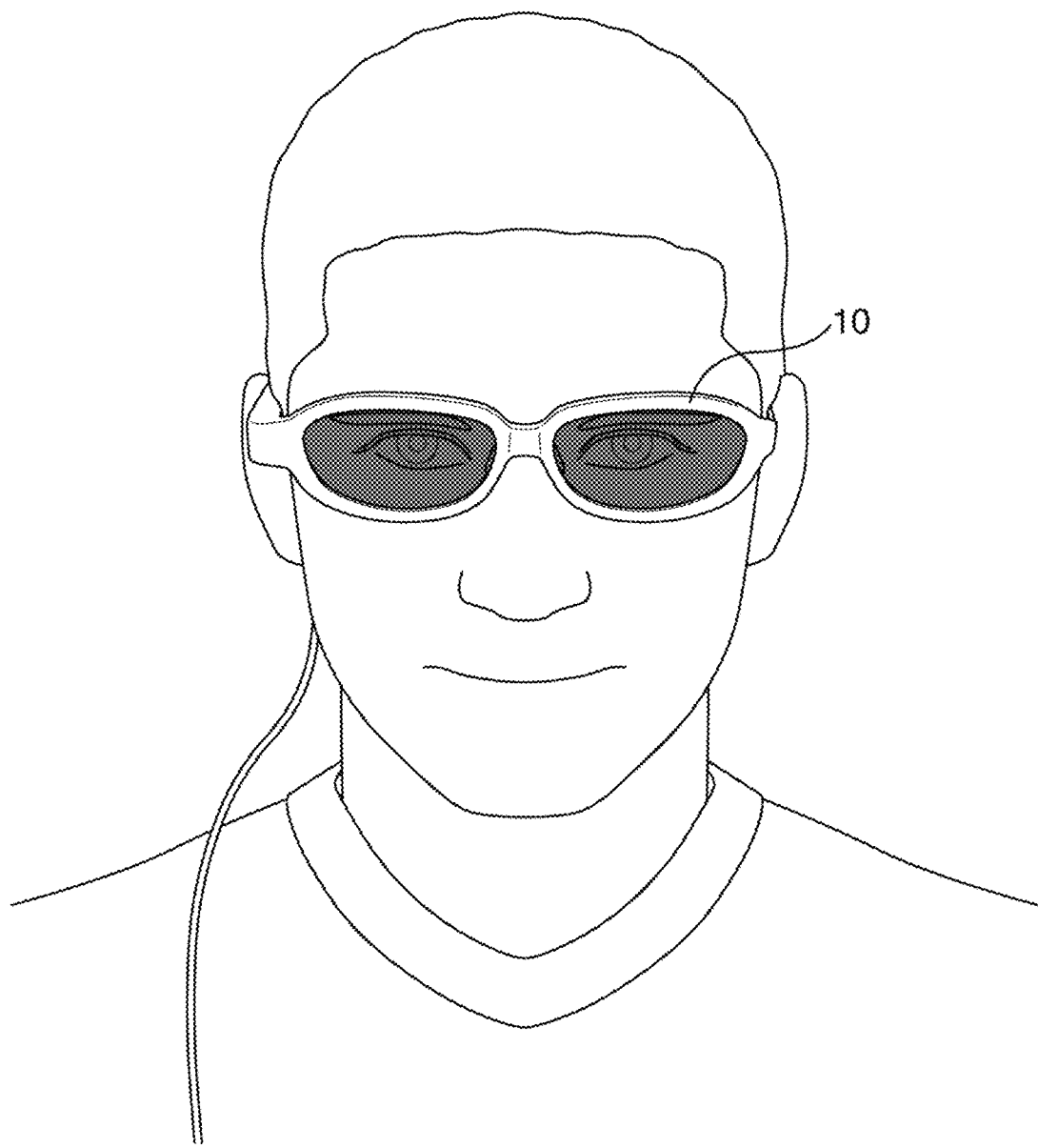
FIG. 1C is a diagram illustrating the video display device 10 shown in FIG. 1B being worn.

FIG. 1C is a diagram illustrating the video display device 10 of FIG. 1B being worn.

Figure 1D:
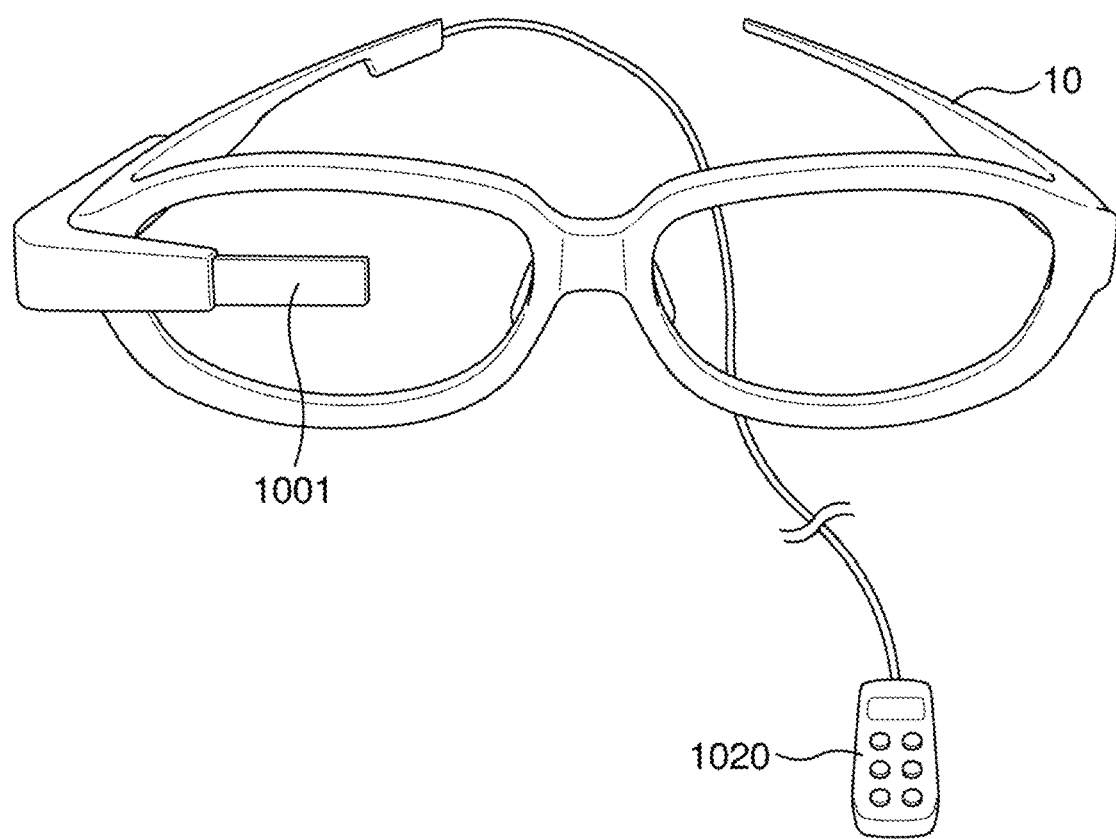
FIG. 1D is a diagram illustrating another example of the outer appearance of the video display device 10.

FIG. 1D is a diagram illustrating an another example of the outer appearance of the video display device 10. Main components are housed in the junction between a lens and a temple, and a prism serves as a projection unit (2007 in FIG. 2) of the video display unit 1001.

Figure 1E:
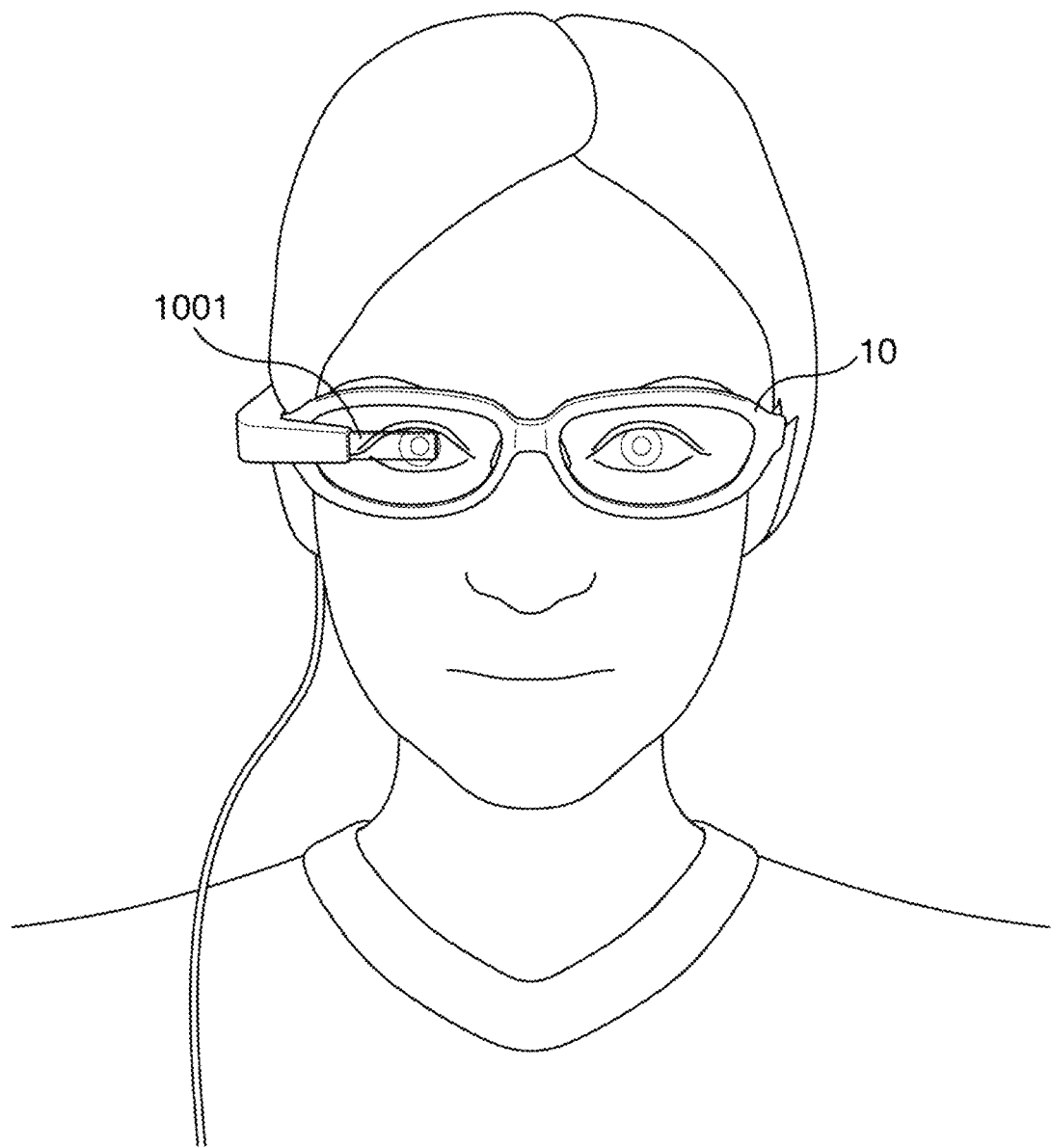
FIG. 1E is a diagram illustrating the video display device 10 shown in FIG. 1D being worn.

FIG. 1E is a diagram illustrating the video display device 10 of FIG. 1D being worn.

Figure 1F:
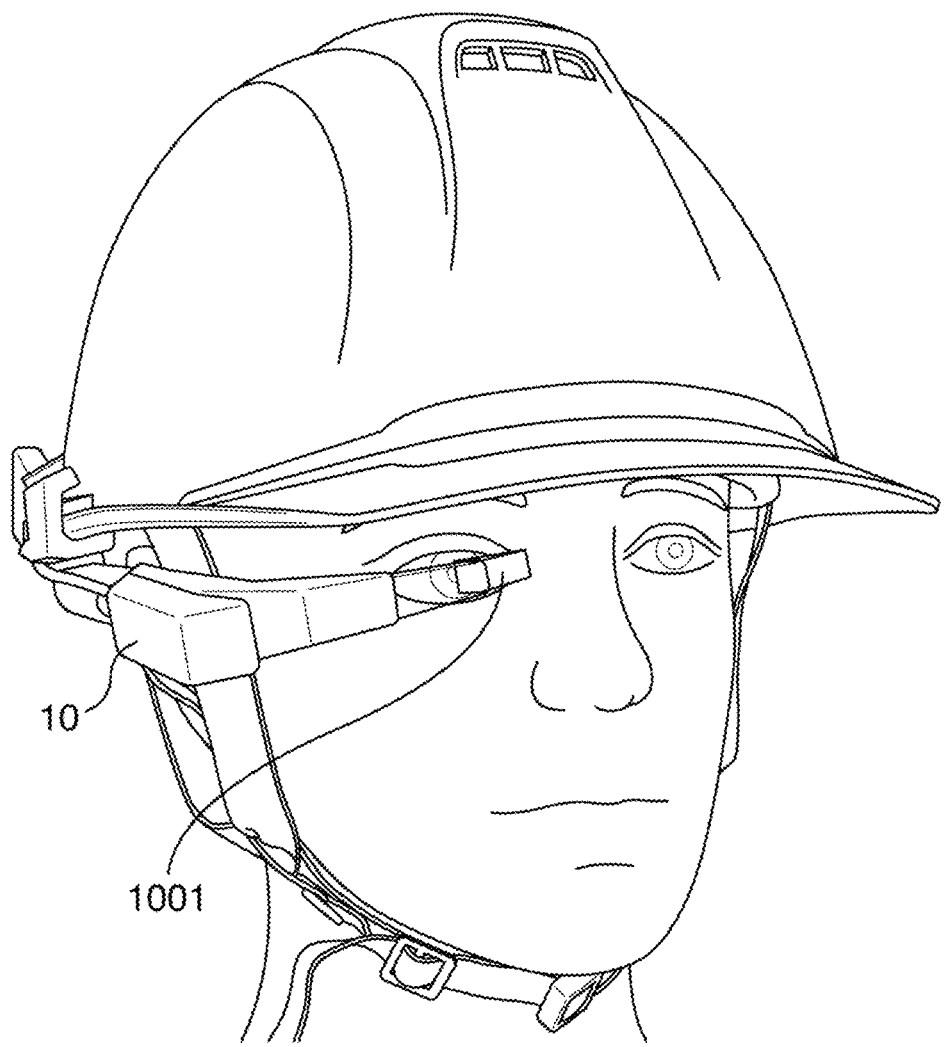
FIG. 1F is a diagram illustrating yet another example of the video display device 10 being worn.

FIG. 1F is a diagram illustrating yet another example of the outer appearance of the video display device 10. A prism before an eye serves as a projection unit (2007 in FIG. 2) of the video display unit 1001, and other components are housed separately in a helmet and in a temple.

2. Displaying a Video

Figure 2:
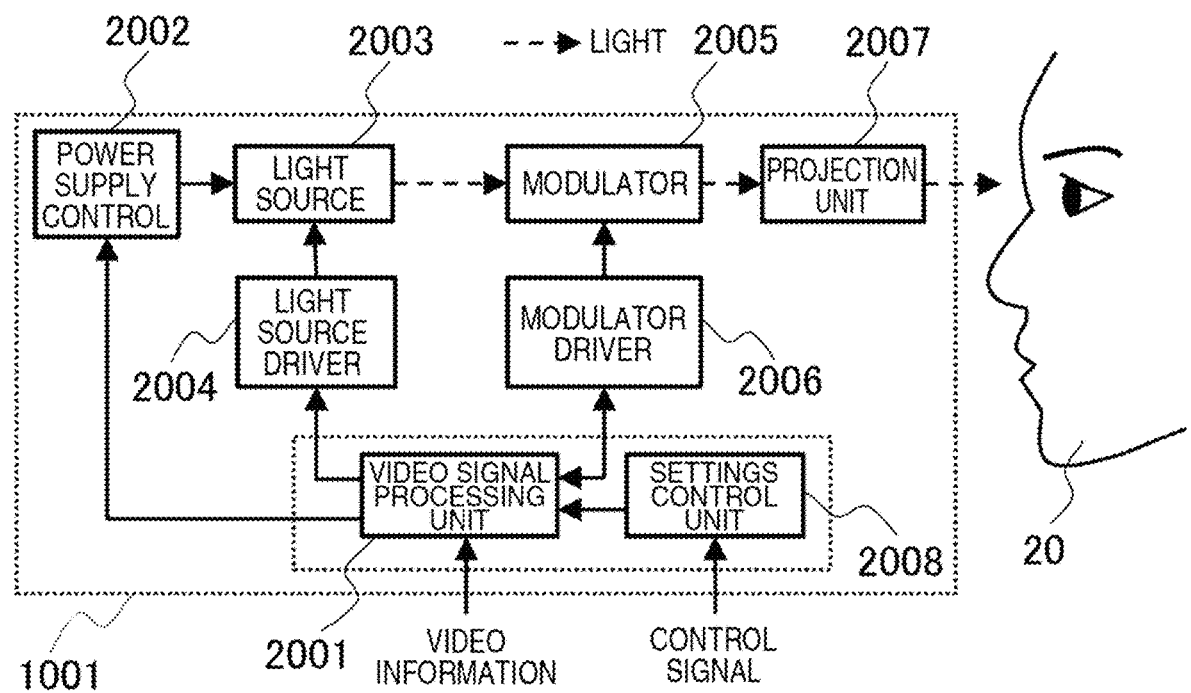
FIG. 2 is a block diagram illustrating an embodiment of a video display unit 1001 in the video display device 10.

FIG. 2 illustrates an example configuration of the video display unit 1001. The video display unit 1001 includes a video signal processing unit 2001, a light source element power supply control unit 2002, a light source element 2003, a light source driver 2004, a modulator 2005, a modulator driver 2006, a projection unit 2007, and a settings control unit 2008.

Video information from the video processing unit 1008 is sent to the video signal processing unit 2001, and the video signal processing unit 2001 determines, for the received video information, the intensity of the light source, timing to drive the light source, and a modulator driving pattern.

Information on the intensity of the light source is transmitted to the light source element power supply control unit 2002. The light source element power supply control unit 2002 controls voltage to supply to the light source element 2003 according to the intensity information received.

The timing to drive the light source is sent to the light source driver 2004. The light source driver 2004 controls the light source element 2003 according to the timing to drive the light source received.

The light source element power supply control unit 2002 and the light source driver 2004 may be mounted on the same element.

Figure 3:
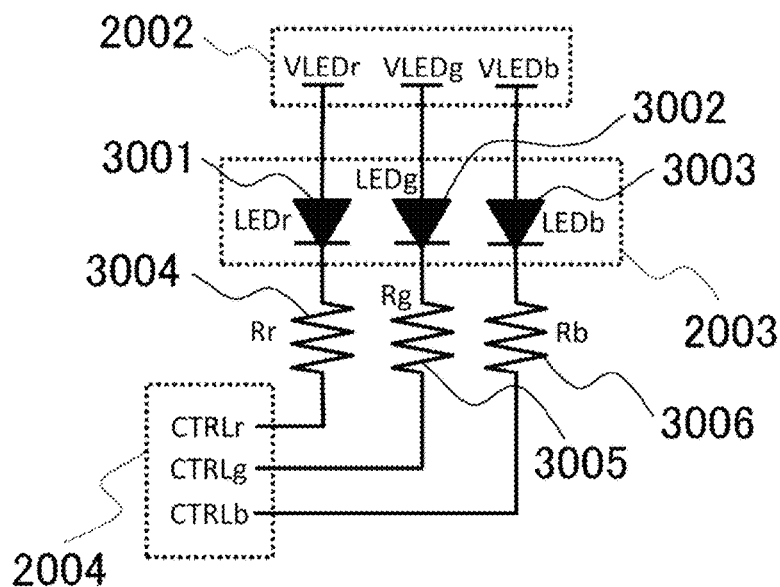
FIG. 3 is a circuitry diagram illustrating an embodiment of a light source element 2003 in the video display unit 1001.

FIG. 3 is a diagram illustrating the configurations of the light source element power supply control unit 2002, the light source element 2003, and the light source driver 2004 in detail. The light source element 2003 is formed by LEDs of the three primary colors: a red LED 3001, a green LED 3002, and a blue LED 3003. The three LEDs are connected in series with current limiting resistances 3004, 3005, and 3006, respectively, and receive potentials VLEDr, VLEDg, and VLEDb, respectively, from the light source element power supply control unit 2002. The potentials VLEDr, VLEDg, and VLEDb can be set to any values by the light source element power supply control unit 2002, and thereby light emissions by the red LED 3001, the green LED 3002, and the blue LED 3003 can be controlled. The terminals of the current limiting resistances 3004, 3005, and 3006 opposite from the LEDs are connected to the light source driver 2004. By changing the potentials at terminals CTRLr, CTRLg, and CTRLb, the light source driver 2004 controls the amounts of light emission, the durations of light emission, and the like of the red LED 3001, the green LED 3002, and the blue LED 3003, respectively, and the modulator 2005 thus performs modulation for all the pixels. The display control unit 1002 sends the settings control unit 2008 of the video display unit 1001 control signals specifying the intensities of the light sources.

Although it has been described above that the light source has LEDs of the three primary colors, the present invention is not limited to such a configuration. The light source may have one or more white LEDs. Also, the light source does not need to be LEDs. With regard to the three primary colors, the light source may be configured to, instead of emitting only the primary colors, extract a particular color by filtering using, for example, a white light source and a dichroic filter, a color wheel, or the like.

FIG. 2 is referenced again.

The modulator driving pattern is transmitted to the modulator driver 2006. The modulator driver 2006 drives the modulator 2005 according to the modulator driving pattern.

Examples of the modulator 2005 include a transmissive liquid crystal element, an LCOS (Liquid Crystal On Silicon), a DMD (Digital Mirror Device), and the like.

The modulator 2005 and the modulator driver 2006 may be configured as a single element component.

The following description assumes that the modulator 2005 is an LCOS type.

Light emitted from the light source element 2003 is modulated by the modulator 2005 and projected onto the projection unit 2007.

Examples of the projection unit 2007 is a reflective object such as a mirror, a scattering object such as a screen, a prism, a half mirror, a lens, and the like. Any of these may be used in combination.

Depending on the structure of the projection unit 2007 and on the addition of other component, the video display device 10 of the present invention may be in the opaque, goggle-like form in which the view of the device user 20 is covered, or in the transparent form in which the device user 20 can see the surroundings and recognize a video in part of their view. The following description assumes the transparent form.

Figure 7A:
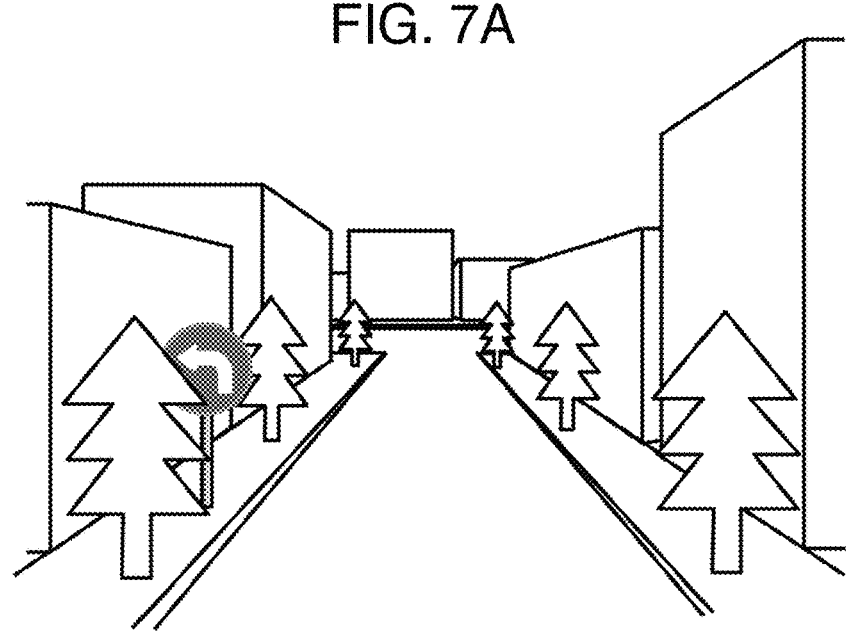
FIG. 7A is an example of the surroundings.
Figure 7B:
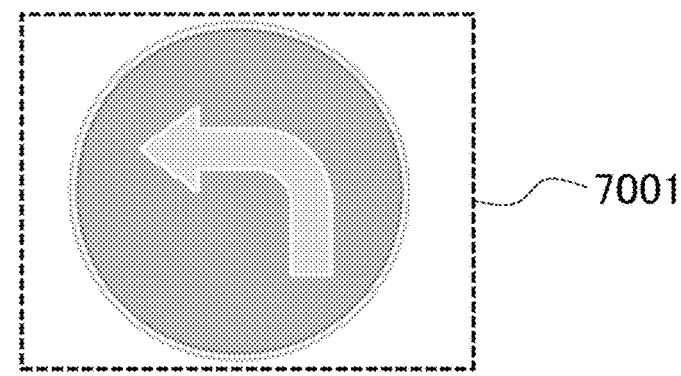
FIG. 7B is an example of a virtual video displayed by the video display device 10.
Figure 7C:
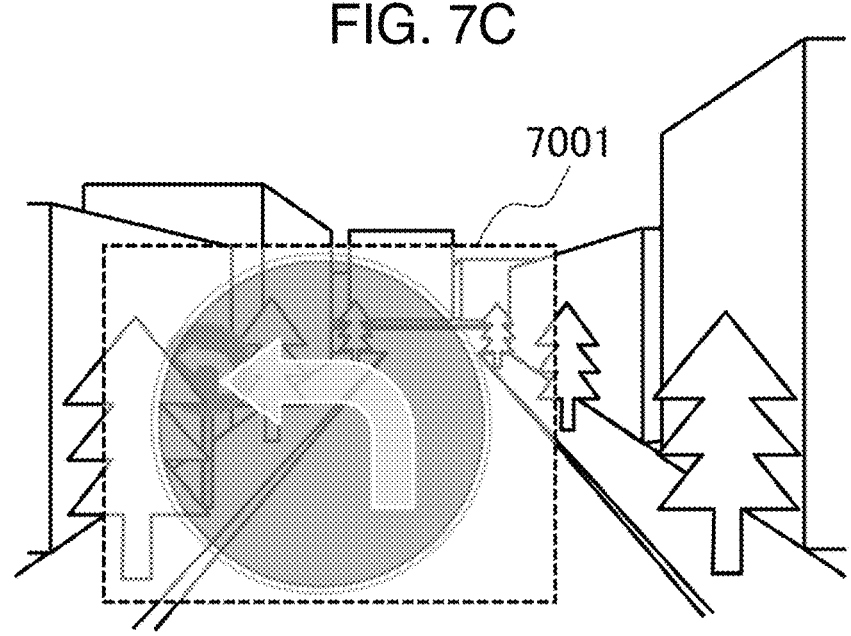
FIG. 7C is an example of how a virtual video is superimposed over the surroundings.

In the transparent form, the device user 20 sees a video as illustrated in FIGS. 7A, 7B, and 7C. Specifically, the device user 20 can see a video like the one in FIG. 7C, in which a virtual video 7001 like the one in FIG. 7B is superimposed over the surroundings like the one in FIG. 7A.

The video display device 10 is in either a form in which a video is projected to both of the eyes of the device user 20 or a form in which a video is projected to only one of the eyes. Although FIG. 2 illustrates a case where a video is projected to only one of the eyes, it is possible to project a video to both of the eyes by configuring the video display device 10 to include two projection units 2007 so that light from the modulator 2005 may be incident on both the left and right eyes. Further, the video display device 10 may be configured with two video displays units 1001—one for the right eye and one for the left eye—to display a three-dimensional video by projecting parallax images onto the respective video displays units 1001.

By observing the light from the projection unit 2007, the device user 20 recognizes light representing the input video information, as a video.

The settings control unit 2008 can receive a control signal and change the settings of the video signal processing unit 2001.

The video display unit 1001 has two or more display methods for displaying a video. FIGS. 4A, 4B, 4C, and 4D illustrate display methods by way of example. For example, video information is handled as moving image information in which N still images per second in average are arranged in a predetermined order (N is a positive number of 1 or larger). In this regard, N is called a frame rate, and the number of still images per second is expressed by flames per second (fps). At present, a typical frame rate is, for example, 30 fps and 60 fps. In the examples in FIG. 4, the number of times of display by the video display unit 1001 is changed with respect to the frame rate of video information.

Figure 4A:
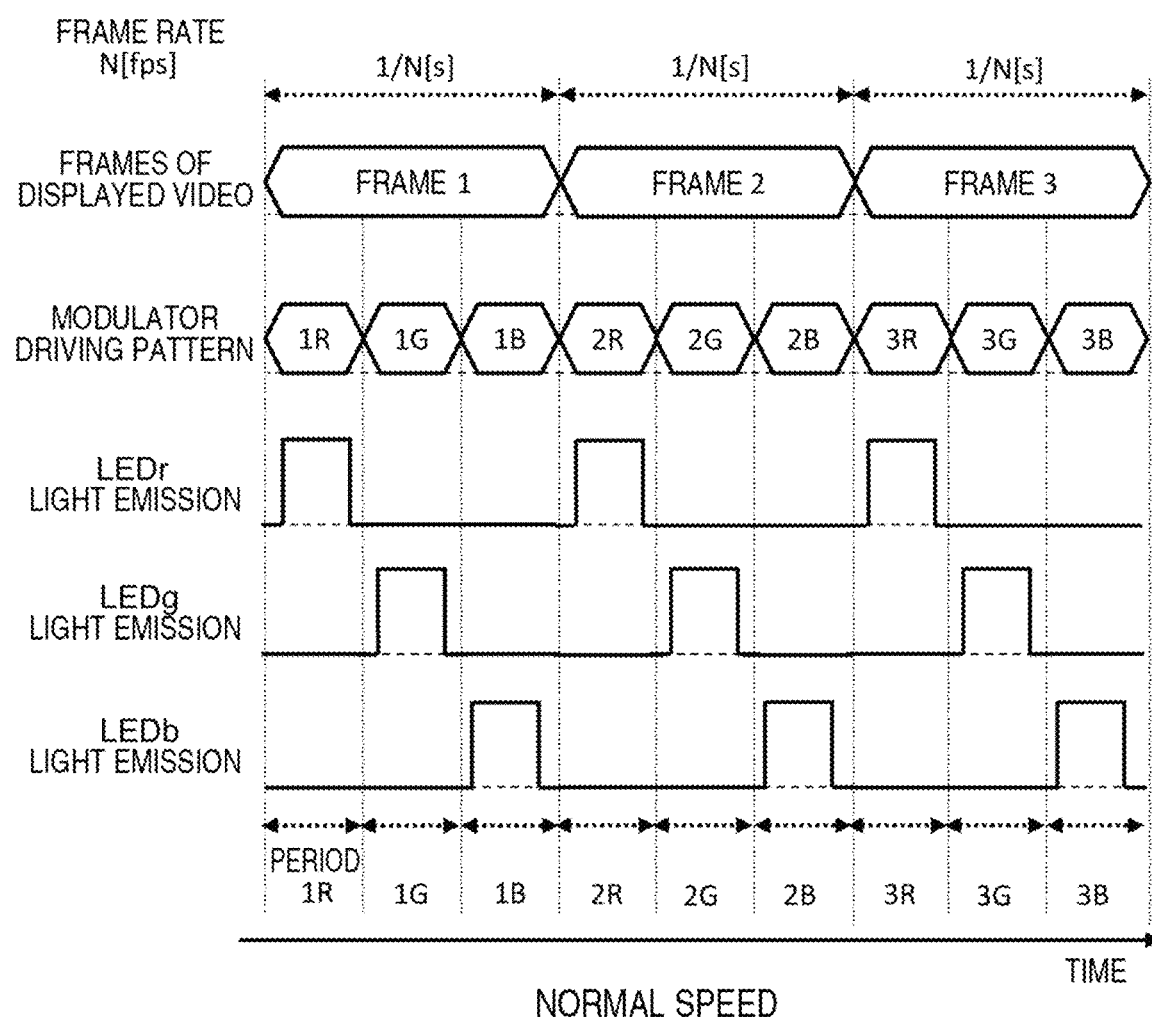
FIG. 4A is a timing chart illustrating an example of a normal-speed display operation of the video display unit 1001 in the video display device 10.

FIG. 4A illustrates a first display method by way of example. In the first display method, the video display unit 1001 changes a displayed video every 1/N second with respect to the frame rate N. A displayed video is referred to as a frame.

The following description assumes as an example that the present embodiment employs the field sequential scheme (color time-division scheme). Specifically, for each frame to display, the video display unit 1001 divides video information into primary color components of red, green, and blue, and further divides the 1/N second into three time slots, and displays the videos of the color components in the respective time slots separately.

For example, in the first time slot of a frame 1, a setting (1R) is made such that the modulator 2005, which is an LCOS, displays the red component of the divided video information on the frame 1, causing the red LED 3001 to emit light for a predetermined period of time (a period 1R) shorter than 1/(3N) second. Next, a setting (1G) is made such that the modulator 2005 displays the green component of the frame 1, causing the green LED 3002 to emit light for a predetermined period of time (a period 1G) shorter than 1/(3N) second. Further, a setting (1B) is made such that the modulator 2005 displays the blue component of the frame 1, causing the blue LED 3003 to emit light for a predetermined period of time (a period 1B) shorter than 1/(3N) second. By displaying the color components sequentially at a high speed, the observer wearing the device sees full-color images in which the three primary color component are mixed together.

Such display of each color component is performed similarly for the frames 2 and 3 of the display video. Although FIGS. 4A to 4D depict only up to the frame 3, similar processing is repeatedly performed for the rest of the frames, as well.

Figure 4B:
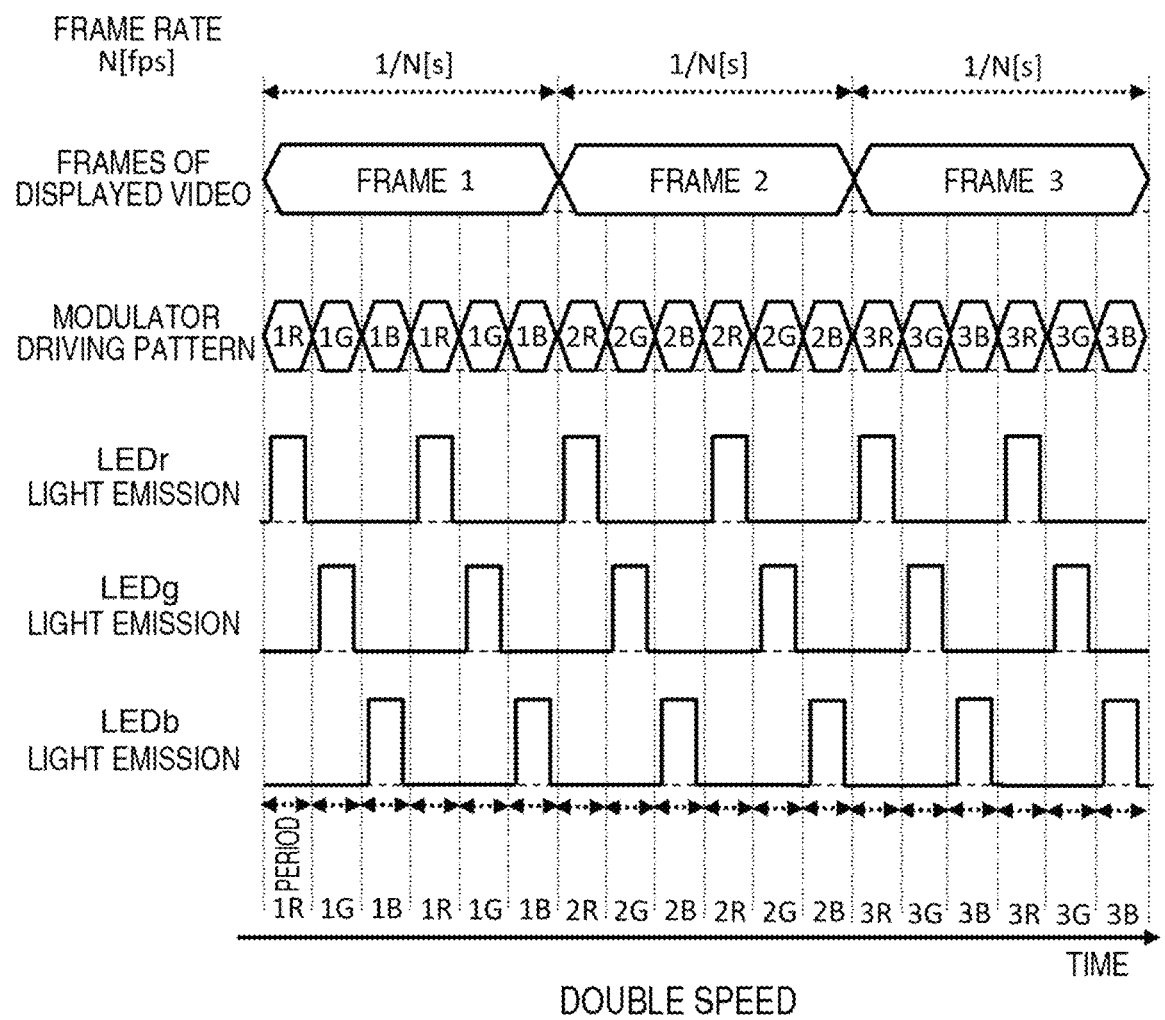
FIG. 4B is a timing chart illustrating an example of a double-speed display operation of the video display unit 1001 in the video display device 10.

FIG. 4B illustrates a second display method by way of example. In the second display method, the period of time the modulator 2005 displays each color component in one frame is further halved compared to the first display method of FIG. 4A, and therefore, one color component is displayed in a time slot which is one sixth of a 1/N second of the frame rate N for a displayed video. This second display method is called double-speed driving because it drives the modulator 2005 at an update speed twice as high as the first display method.

It is also possible to achieve a display method with triple-speed, quadruple-speed, or higher driving by increasing the driving speed of the modulator 2005 and the light source element 2003. To change the driving speed of the modulator 2005 and the light source element 2003 is to change the intervals of updating information on the pixels of the liquid crystal element or the mirror array element. FIG. 4D shows a timing chart of triple-speed driving.

Figure 4C:
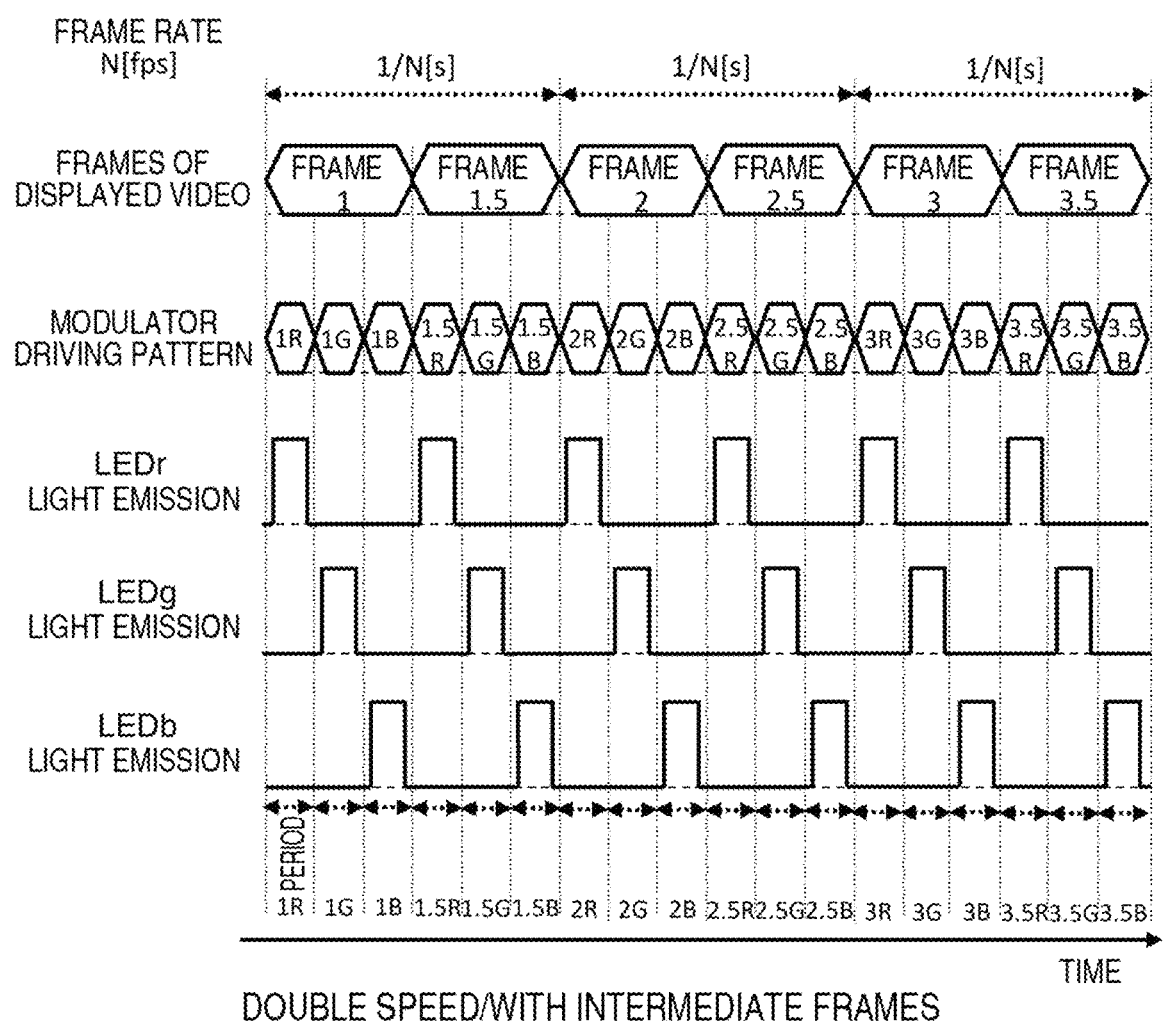
FIG. 4C is a timing chart illustrating an example of a double-speed operation of the video display unit 1001 in the video display device 10, in which frame interpolation is performed.
Figure 4D:
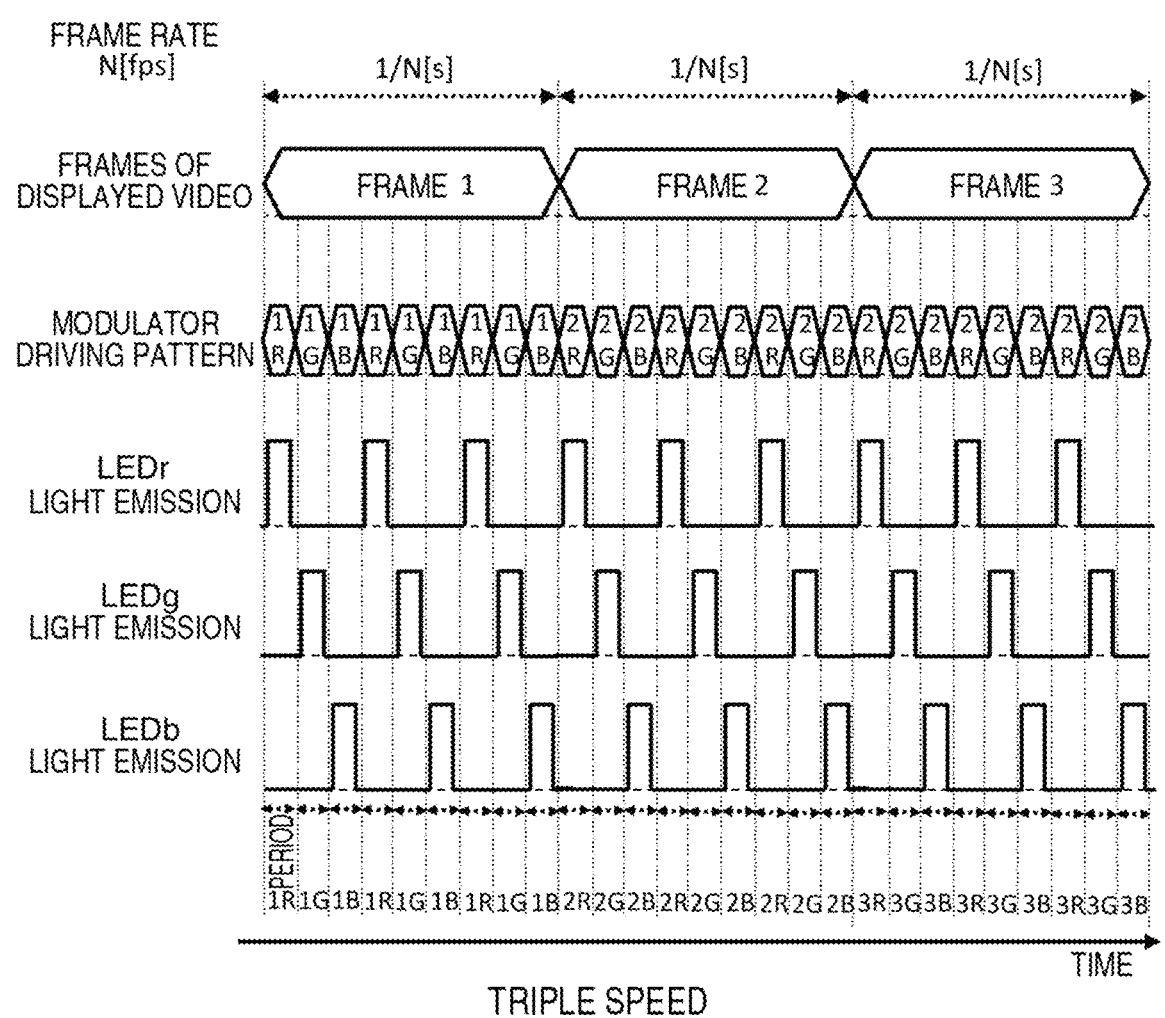
FIG. 4D is a timing chart illustrating an example of a triple-speed display operation of the video display unit 1001 in the video display device 10.

FIG. 4C illustrates a modification regarding double-speed driving. The intervals of driving the modulator 2005 and the light source element 2003 are the same as those in the display method of FIG. 4B. An intermediate frame 1.5 is generated from the video of the frames 1 and 2, and other frames, of the original video information, and the video is displayed in the order of the frame 1, the frame 1.5, and the frame 2, so that the observer sees the video as smooth images. The intermediate frames are generated by the video processing unit 1008.

Generation of intermediate frames is possible even when, for example, the update speed is higher than double speed, such as triple speed or quadruple speed like the case in FIG. 4D, and is not limited to double speed.

By raising the speed from normal-speed display to double-speed display or to triple-speed display, or by generating intermediate frames, the motion of the images becomes smoother, and the device user 20 is less likely to sense color breakup and therefore feel less uncomfortable. However, more power is consumed.

Via the settings control unit 2008 of the video display unit 1001, the display control unit 1002 sends a control signal commanding a switch to a different display method.

The video processing unit 1008 is capable of making a change to video information inputted from the video information source 1007 and outputting the changed video information to the video display unit 1001.

For example, video information is H×V-pixel data containing H pixels vertically (where H is an integer of 1 or larger) and V pixels horizontally (where V is an integer of 1 or larger) per frame.

Changing the contrast of an image involves processing to change the differences between color tones, or in particular, processing to obtain a pixel value to output to the video display unit 1001 by multiplying a pixel value inputted from the video information source 1007 by a proportionality coefficient larger than 1.

Changing the brightness of an image involves processing to obtain an output pixel value by increasing a pixel value by a designated value, or in particular, processing to obtain a pixel value to output to the video display unit 1001 by adding any value to a pixel value inputted from the video information source 1007.

According to a signal from the control unit 1003, the video processing unit 1008 performs processing such as increasing or decreasing the contrast of an image and/or increasing or decreasing the brightness of an image.

The video processing unit 1008 may change other image-related parameters, such as sharpness, saturation, and hue, according to a signal from the control unit.

Also, according to a signal from the control unit 1003, the video processing unit 1008 may be switched to transmit video information to the video display unit 1001 without subjecting the video information to any of the above processing.

Figure 8A:
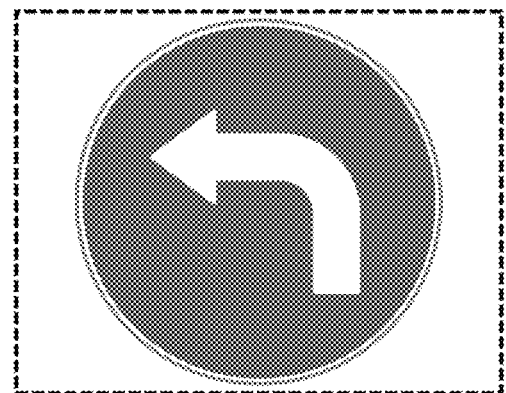
FIG. 8A is an example of a video displayed by the video display device 10.
Figure 8B:
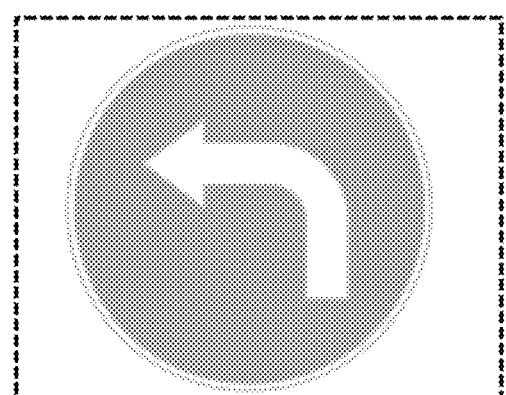
FIG. 8B is an example of a displayed video the contrast of which has been lowered by a video processing unit 1008.
Figure 8C:
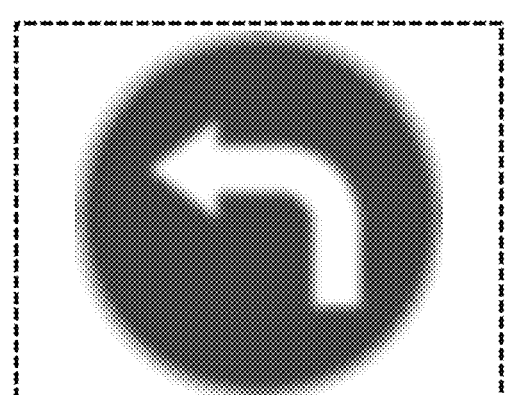
FIG. 8C is an example of a displayed video the sharpness of which has been lowered by the video processing unit 1008.

For example, decreasing the contrast of the video illustrated in FIG. 8A yields the video in FIG. 8B. Meanwhile, decreasing the sharpness of the video in FIG. 8A yields the video in FIG. 8C. As will be described later, when the viewpoint of the device user 20 is not positioned on an image video being displayed, its contrast or sharpness may be decreased so that eye strain of the device user 20 can be reduced.

3. Movement of the Device User and Control of Video

The first sensor 1004 is a sensor for detecting the turning of the head of the device user 20, and is for example a gyro sensor. The first sensor 1004 outputs a three-dimensional motion vector indicating a head movement over a predetermined period of time. The second sensor 1005 is a line-of-sight sensor for detecting the movement of the line of sight or the position of the point of gaze, and outputs a two-dimensional or three-dimensional vector indicating the movement of the line of sight of the device user 20 over a predetermined period of time.

The motion determination processing unit 1006 determines the motional state of the device user 20 based on the outputs from the first sensor 1004 and the second sensor 1005. Specifically, the motional state includes three items: a movement of the head, a movement of the line of sight, and the directions of the movement of the head and the movement of the line of sight. A description will be given later as to the processing to determine these three items from the sensor outputs. Further, the motion determination processing unit 1006 determines whether the point of gaze is on the virtual video 7001 being displayed by the video display device. A detailed description for this processing will be given later, as well.

Based on the determination results obtained by the motion determination processing unit 1006, the control unit 1003 determines which processing to perform in accordance with FIG. 5 and commands a display speed for the video display unit 1001 to the display control unit 1002, and commands processing related to video parameters to the video processing unit 1008.

Pattern 1 in FIG. 5 is a case where there is no movement of the head of the device user 20, there is no movement of the line of sight, and the point of gaze is on the virtual video. In this case, the device user 20 is still, and it is unlikely that the device is shaken or the positional shift occurs between the device and the device user 20. Also, there is no movement in the eyes. A phenomenon such as color breakup that may give a discomfort to the device user 20 is not likely to occur. In such a case, the control unit 1003 commands processing A, since there is barely need to pay consideration to the effect on discomfort.

In processing A, the display method of the video display unit 1001 is normal-speed driving, and the video processing unit 1008 passes a video from the video information source to the video display unit 1001 without making any change to the video by performing video processing thereon. This processing consumes the least power.

Pattern 2 in FIG. 5 differs from pattern 1 in that the point of gaze detected by the second sensor 1005 is not on the virtual video. In this case, the device user 20 is not in motion and not viewing the virtual video 7001, and therefore, the importance in visibility is low. Then, the control unit 1003 commands processing B.

In processing B, the display method of the video display unit 1001 is normal-speed driving, and the video processing unit 1008 lowers the contract and brightness of the video by a prescribed amount.

Patterns 3, 5, and 8 in FIG. 5 are cases where the movement of either the head or the line of sight of the device user 20 is detected, and the point of gaze is on the virtual video.

In these patterns, the device user 20 is not still, and there is an increased possibility that the device user 20 of the video display device 10 feels uncomfortable, increasing the need to pay consideration to discomfort. Thus, the control unit 1003 commands processing C to reduce discomfort.

In processing C, the display method of the video display unit 1001 is set to a higher update speed, triple speed, and the video processing performed by the video processing unit 1008 is initialized.

Patterns 4, 6, and 9 are cases where the movement of either the head or the line of sight of the device user 20 is detected, and the point of gaze is not on the virtual video.

In these patterns, the device user 20 is not still, and there is an increased possibility that the device user 20 of the video display device 10 feels uncomfortable. However, since the device user 20 is not viewing the virtual video 6001, the importance in visibility is low. Thus, the control unit 1003 commands processing D.

In processing D, the display method of the video display unit 1001 is set to a higher update speed, triple speed, and the video processing unit 1008 lowers the contract and brightness of the video by a prescribed amount.

In pattern 7 in FIG. 5, both the movement of the head and the movement of the line of sight of the device user 20 are detected. If the direction of the movement of the head substantially matches the direction of the movement of the line of sight, the device user 20 is likely making an eye movement called saccades, and viewing neither the surroundings nor the virtual video 7001. While consideration still needs to be paid to the device user 20 for the discomfort that may be felt from the video, the importance in visibility of the virtual video is low. Thus, the control unit 1003 commands processing D described above.

Figure 6:
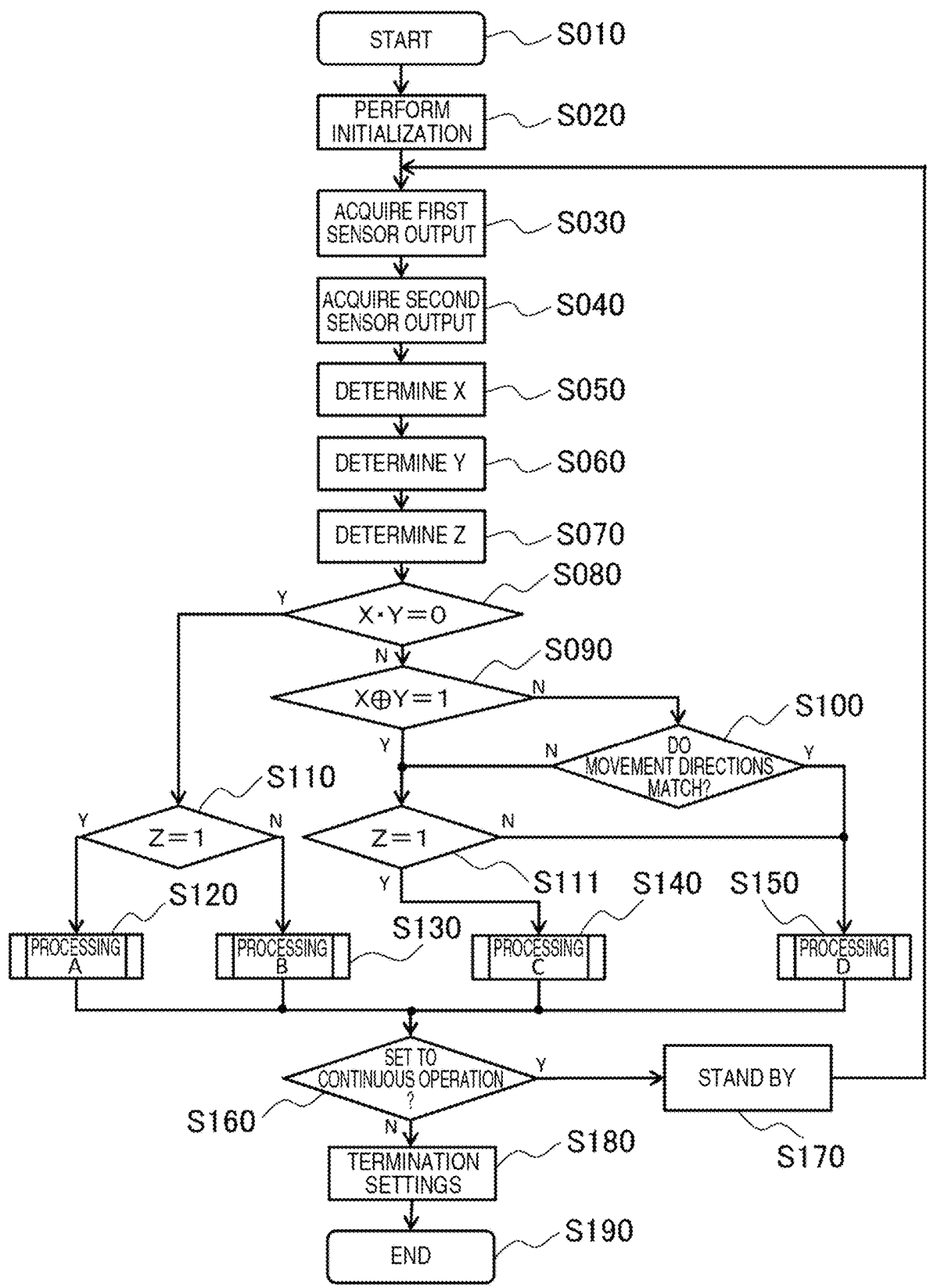
FIG. 6 is a flowchart of determination processing performed by a control unit 1003 and the motion determination processing unit 1006.

FIG. 6 is a flowchart for implementing the pattern-based control illustrated in FIG. 5, which is performed by the control unit 1003 and the motion determination processing unit 1006.

Processing starts in Step S010 when the power switch on the device main body is turned on, or when the device user 20 issues an instruction.

In Step S020, the control unit 1003 performs processing for initialization and processing for energization of the first sensor 1004 and the second sensor 1005. In the initialization processing, the control unit 1003 sets the display method of the video display unit 1001 to double speed, and initializes various parameters of the video processing unit 1008 to prescribed default values.

In Step S030, the motion determination processing unit 1006 acquires a sensor output from the first sensor 1004.

In Step S040, the motion determination processing unit 1006 acquires a sensor output from the second sensor 1005.

In Step S050, the motion determination processing unit 1006 determines, based on the output from the first sensor, whether or not the magnitude of the turning speed of the head is higher than or equal to a prescribed value A1 (A1 is a positive value), and handles the determination result as X. X is true ('1') when the detection result is higher than or equal to the prescribed value A1, and false ('0') when the detection result is lower than the prescribed value A1.

In Step S060, the motion determination processing unit 1006 determines, based on the output from the second sensor, whether or not the magnitude of the motional speed of the line of sight is higher than or equal to a prescribed value S1 (S1 is a positive value), and handles the determination result as Y. Y is true ('1') when the detection result is higher than or equal to the prescribed value S1, and false ('0') when the detection result is lower than the prescribed value S1.

In Step S070, the motion determination processing unit 1006 determines, based on the output from the second sensor, whether the two-dimensional coordinates of the position of the line of sight (the point of gaze) is on the virtual image (inside a predetermined range), and handles the determination result as Z. Z is true ('1') when the position of the point of gaze is inside the predetermined range, and false ('0') when the position of the point of gaze is outside the predetermined range.

Refer to FIG. 5 for these X, Y, and Z and their values.

In Step S080, the motion determination processing unit 1006 performs conditional branching based on the logical AND of the determination result X and the determination result Y. Processing proceeds to Step S110 if X·Y=0, and proceeds to Step S090 if X·Y=1.

In Step S090, the motion determination processing unit 1006 performs conditional branching based on the exclusive OR (XOR) of the determination result X and the determination result Y. Processing proceeds to Step S111 if X XOR Y=1, and proceeds to Step S100 if X XOR Y=0.

In Step S110, if Z is true, processing proceeds to Step S120 in which the control unit 1003 commands processing A, and if Z is false, processing proceeds to Step S130 in which the control unit 1003 commands processing B.

In Step S100, the motion determination processing unit 1006 compares the direction of the motional speed of the head, outputted from the first sensor 1004, and the direction of the movement of the line of sight, outputted from the second sensor 1005, with each other, and determines whether the directions of motion vectors substantially match each other. A method for this determination will be described later.

In Step S111, the motion determination processing unit 1006 performs conditional branching based on the determination result Z. If Z is true, processing proceeds to Step S140 in which the control unit 1003 commands processing C, and if Z is false, processing proceeds to Step S150 in which the control unit 1003 commands processing D.

In Step S160, it is determined whether a setting has been made to repeat the processing in this flowchart continuously. This setting may be made or changed by the device user 20 or may be set by default. If such a setting is enabled, the processing proceeds to a standby step S170, and if such a setting is disabled, the processing proceeds to a termination step S180.

In Step S170, the processing stands by for a predetermined period of time (approximately 300 milliseconds to 10 seconds), and then proceeds back to Step S030.

In Step S180, the processing performs, for the first sensor 1004 and the second sensor 1005, power-off processing or idle setting.

The processing ends at an end step S190.

The video display device 10 has the storage unit 1010. After changing the display method of the video display unit 1001 or the processing method of the video processing unit 1008, the control unit 1003 records the history, the time, and the like of the change in the storage unit 1010.

When the number of changes to certain processing recorded in the storage unit 1010 exceeds a predetermined number within a predetermined period of time, e.g., when five changes are made in three days, the frequency determination processing unit 1011 requests the video information source 1007 to change the video information settings according to the change history. The request to change video information is issued for example in the termination processing in Step S180 of FIG. 6, and to change video information is to change parameters such as image contrast, sharpness, saturation, hue, image brightness, and the like.

4. Line-of-Sight Sensor

An example of the second sensor 1005 as a line-of-sight sensor is now described.

Figure 11A:
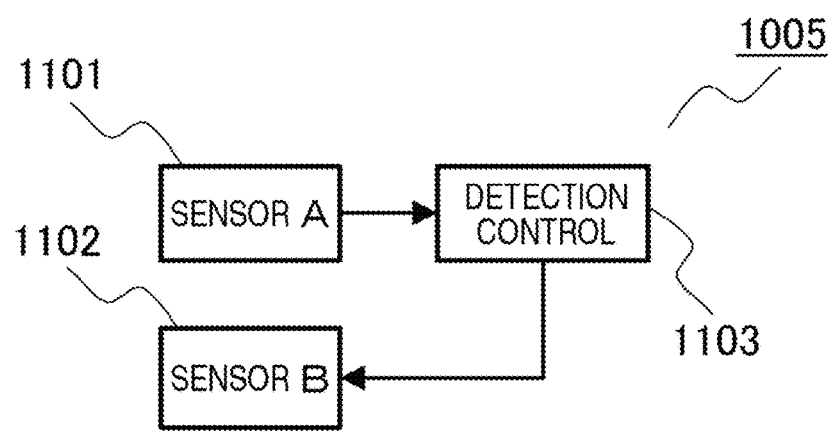
FIG. 11A is a diagram illustrating an embodiment of a second sensor.

As illustrated in FIG. 11A, the second sensor 1005 includes a sensor A element 1101, a sensor B element 1102, and a detection controller 1103. When the sensor A element 1101 detects a movement, the detection controller 1103 activates the sensor 2 element 1102 and instructs the sensor B element to output more precise data.

Figure 11B:
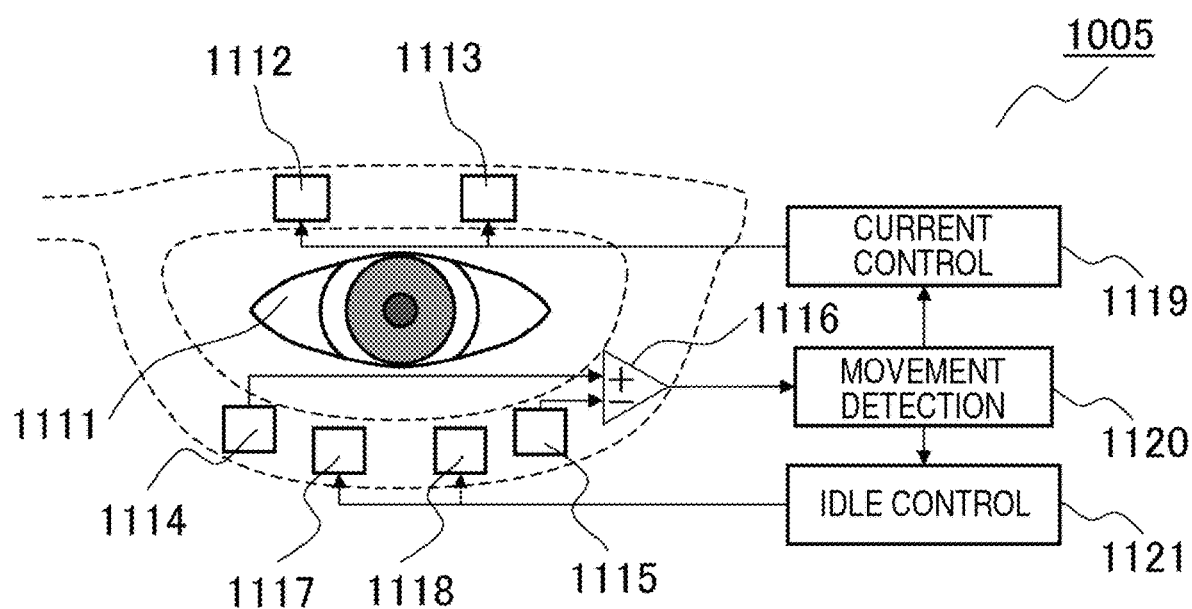
FIG. 11B is a diagram illustrating the embodiment of the second sensor in detail.

FIG. 11B illustrates the configuration more specifically. This configuration is suitable to be mounted on a frame part of a glasses-like device, like the ones in FIGS. 1B and 1D. The line-of-sight sensor is capable of detecting the movement of an eye 1111 of the device user 20, and includes a first light emitter 1112 and a second light emitter 1113 that emit infrared light, a first light receiver 1114 and a second light receiver 1115, a comparator 1116, a first camera 1117 and a second camera 1118, a current control unit 1119, a movement detection processing unit 1120, and an idleness control unit 1121.

Infrared light emitted by the first light emitter 1112 and the second light emitter 1113 is projected onto and reflected by the eye 1111 of the device user 20. The reflected infrared light is incident on the first light receiver 1114 and the second light receiver 1115. The first light receiver 1114 and the second light receiver 1115 are installed in different directions, the left side and the right side, of the eye 1111, and receive varying amounts of light depending on the position of the iris and the position of the white part of the eye. Since the first light receiver 1114 and the second light receiver 1115 are placed on the left side and the right side of the eye 1111, a change in the amount of light received due to a displacement of the eye 1111 is different for each light receiver. A movement of the eye 1111 can be detected when the comparator 1116 obtains the difference between the amount of light received by the first light receiver 1114 and the amount of light received by the second light receiver 1115. This detection method is called a scleral reflection method.

When an output from the comparator 1116 is larger than or equal to a predetermined value, the movement detector 1120 determines that a movement of the eye 1111 is detected, and outputs a movement detected signal. When an output from the comparator 1116 is smaller than the predetermined value, the movement detector 1120 determines that the eye 1111 has not moved, and outputs a movement undetected signal.

Upon receipt of a movement detected signal from the movement detector 1120, the idleness control unit 1121 brings the first camera 1117 and the second camera 1118 to an imaging state capable of imaging videos, and these cameras image the eye 1111 using the infrared light reflected by the eye 1111. An image processing unit (not shown) performs image processing on the videos imaged by the first camera 1117 and the second camera 1118, to estimate a detailed movement of the line of sight and the position of the viewpoint. A dark pupil method, a corneal reflection method, or the like is used for the image processing.

Upon receipt of a movement undetected signal from the movement detector 1120, the idleness control unit 1121 brings the first camera and the second camera to an idle state in which part of the functions of the first and second cameras are stopped to reduce power consumption.

The movement detection processing unit 1120 changes power to be supplied to the first light emitter 1112 and the second light emitter 1113 by sending a movement detected signal or a movement undetected signal to the current control unit 1119. The current control unit 1119 performs control such that the amount of current in the imaging state is larger than the amount of current in the idle state.

Typically, camera elements consume more power than light receivers and need more light for detection. Thus, this control method reduces power consumption by the device by bringing the camera elements to the imaging state only when the light receivers have detected a rough movement, instead of keeping the camera elements in the imaging state all the time.

Although two light emitters are used in the present embodiment by way of example, the number of light emitters is not limited to two. The line-of-sight sensor may have more light emitters. Further, the line-of-sight sensor may be so configured that the light emitters are controlled to emit light at different timings, and that the light receivers or camera elements acquire data to coincide with the light emission by the respective light emitters.

Also, although two camera elements and two light receivers are used in the above example, their numbers are not limited to such numbers. Further, a light receiver and a camera element may be configured as a single element, and for example, part of the pixels of a camera element may be configured as a light receiver.

5. Viewpoint Deviation Correction and Detection of the Position of a Point of Gaze In the initialization step S020 illustrated in FIG. 6, initialization processing for the second sensor 1005 may be performed. When the second sensor 1005 is a sensor that detects the line of sight of the device user 20, deviation occurs between the point of gaze of the device user 20 and the position of the second sensor each time the device is used.

Figure 12A:
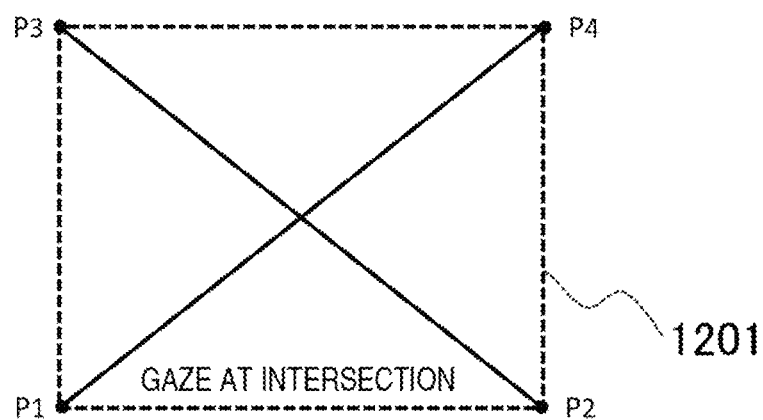
FIG. 12A is an example of a video displayed for initialization of the video display device.

To correct this deviation, during the initialization processing the motion determination processing unit 1006 displays a virtual video 1201 of diagonal lines in a display region as illustrated in FIG. 12A, and displays text prompting the device user 20 to gaze at the intersection of the diagonal lines. When the second sensor 1005 detects that the line of sight is steadily located at the position of the point of gaze for predetermined seconds, the motion determination processing unit 1006 determines that the device user 20 is gazing at the intersection in the virtual video 1201, and sets the position of the point of gaze as a reference position p0 (h0, v0) for the second sensor 1005.

If the full video display range of the video display unit 1001 is, like the virtual video 1201, a square surrounded by P1 (Hmin, Vmin), P2 (Hmax, Vmin), P3 (Hmin, Vmax), and P4 (Hmax, Vmax), then h0=(Hmax−Hmin)/2, and v0=(Vmax−Vmin)/2.

Figure 12B:
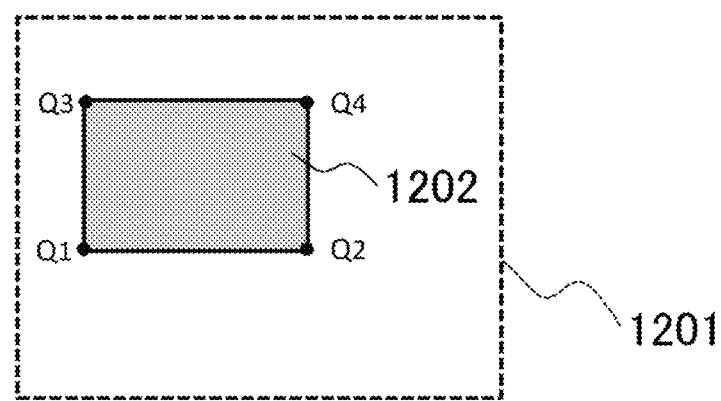
FIG. 12B is a diagram illustrating a range in which to display a video for initialization of the video display device.

In the point-of-gaze determination step S070, it is determined, using the reference position p0 (h0, v0) as the reference, whether the detection result of the second sensor 1005 is on the video displayed on the video display unit 1001 (i.e., whether Z is '1'). Assume a case where the position of the point of gaze obtained by the second sensor 1005 is p (h, v) when, as illustrated in FIG. 12B, any virtual display video 1202 is displayed in a region surrounded by Q1 (Hl, Vd), Q2 (Hl, Vu), Q3 (Hr, Vd), and Q4 (Hr, Vu) (Hmin<=Hl<=Hmax, Hmin<=Hr<=Hmax, Vmin<=Vd<=Vmax, and Vmin<=Vu<=Vmax). In this case, when p (h, v) is inside the square Q1Q2Q3Q4, the motion determination processing unit 1006 determines that the position of the point of gaze is on the virtual video and that Z in Step S070 is true.

The reference position may be detected not in the initialization processing, but in a time designated by the device user 20 through the controller 1020. The device user 20 may command detection timing to the second sensor 1005 by purposely blinking for a particular length or in a particular order before or after gazing at a designated point.

The virtual display video 1202 does not have to be square, but may be in other shapes such as a triangle or a circle.

6. Directions of the Movement of the Head and the Movement of the Line of Sight

The movement determination unit 1006 detects, based on an motion vector output from the first sensor 1004 and a motion vector output from the second sensor 1005, whether the movement of the head and the movement of the line of sight match in direction.

Assume that an output from the first sensor 1004 can be expressed by a three-dimensional vector $A_0$. With the device user 20 being within the range to recognize the virtual video 7001 and S denoting a virtual plane containing the four corners of the virtual video 7001, an orthographic projection vector A of the three-dimensional vector $A_0$ with respect to the plane S is obtained. When an output from the second sensor 1005 is a three-dimensional vector, similar vector transformation processing is performed.

The range in which the device user 20 recognizes the virtual video 7001 is determined by the optical configuration of the projection unit 2007 in the video display unit 1001 and the like, and the device user 20 uses its focusing function of the eyeball to recognize the virtual video 7001 at a location at a predetermined distance.

If the second sensor 1005 outputs a two-dimensional vector B0, the two-dimensional vector B0 is transformed into a three-dimensional vector $B_1$ on a plane T which is in three-dimensional space and contains a detection axis of the second sensor 1005, and an orthographic projection vector B of the three-dimensional vector $B_1$ with respect to the plane S is obtained. When an output from the first sensor 1004 is a two-dimensional vector, similar vector transformation processing may be performed.

When the directions of the movements from the detection sensors are both expressed as vectors on a single plane with A being the motion vector outputted from the first sensor 1004 and B being the motion vector outputted from the second sensor 1005, it is determined whether the directions of the movements substantially match, based on a comparison between the absolute value of an angle θ formed by these vectors, ANGLEθ=ANGLE(A-B), and any value α (α is a positive value).

Specifically, it is determined that the directions of the movements substantially match if θ<=α, and do not match if θ>α.

7. Modifications (1) The first sensor 1004 and the second sensor 1005 may be an acceleration sensor, a geomagnetic sensor, a GPS, a camera that captures the user, a camera that captures a video of the surroundings seen from the user, a sensor that measures user's pulse, a sensor that measures user's blood flow, a watch, or the like. Further, each of the first sensor 1004 and the second sensor 1005 may include a filter, an amplifier, a level shifter, and/or the like. Also, each of the first sensor 1004 and the second sensor 1005 may include a comparator and be configured to transmit, along with the vector value, a binary result indicating whether a detection result is higher or lower than a threshold. Also, the first sensor 1004 and the second sensor 1005 may be configured to output a signal indicating that a movement is detected, when one of the following conditions is met: when the duration time of a movement, being a detection result, exceeds a predetermined period of time, when the speed of a movement exceeds a predetermined speed, and when the displacement of a movement exceeds a predetermined displacement.

(2) Instead of the determination processing that the motion determination processing unit 1006 performs using an output from the first sensor 1004 or the second sensor 1005, the video determination processing unit 1009 may determine image features.

The video determination processing unit 1009 determines whether video information can cause a display discomfort to the device user 20. For example, in a case of a video that moves continuously on the screen like the one illustrated in FIG. 9A, the device user 20 is expected to follow the moving video by moving their eyeballs. Also, for example, in a case of a video with an on-screen content, such as text, that the device user 20 can see its meaning by recognizing it vertically, horizontally, or diagonally like the one illustrated in FIG. 9B, the device user 20 is expected to move their line of sight along the video by moving their eyeballs.

For such an image, the video determination processing unit 1009 can detect a movement in advance by performing video analysis on digital images and referring to the amount in difference data between image frames.

Figure 9A:
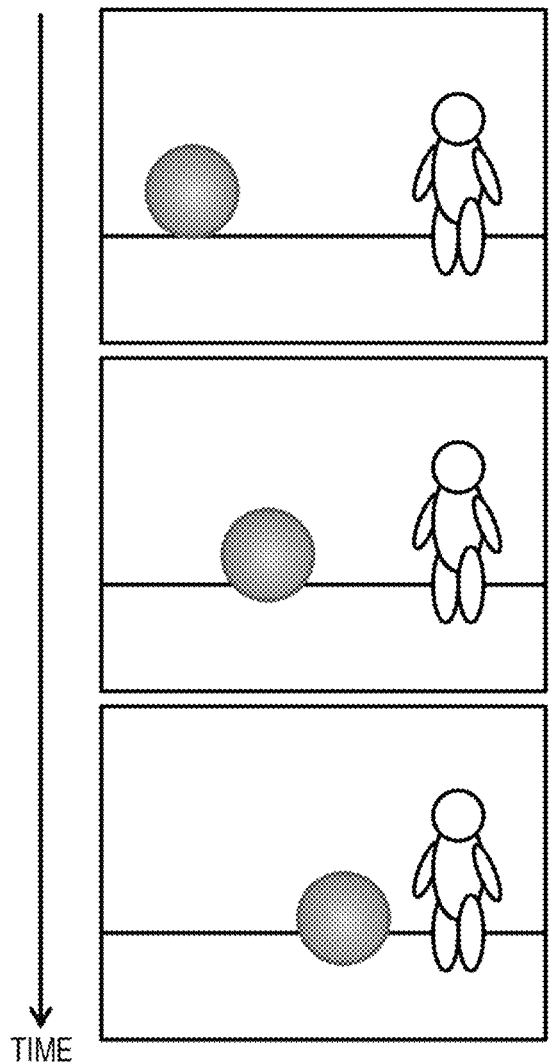
FIG. 9A is an example of a video targeted by a video determination processing unit 1009.
Figure 9B:
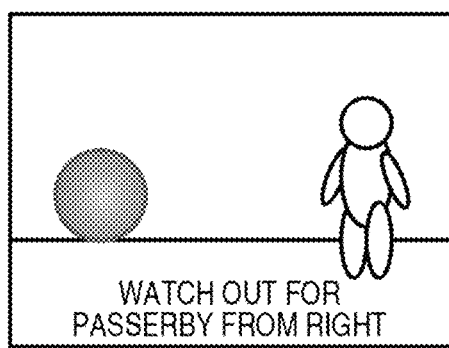
FIG. 9B is another example of a video targeted by the video determination processing unit 1009.

For videos, like the ones in FIGS. 9A and 9B, for which the device user 20 is expected in advance to move their line of sight, the video determination processing unit 1009 outputs a control signal to the control unit 1003 so that the processing C may be employed.

When the projection unit 2007 of the video display device 10 is a transparent type, the video determination processing unit 1009 may determine whether a displayed video is a video related to the surroundings, e.g., an augmented reality (AR) video. The video determination processing unit 1009 can determine the type of a video based on metadata on the video or additional information to the video. For example, the virtual video 7001 in FIG. 7B displays information related to the surroundings in FIG. 7A. When it is determined that a video is related to the surroundings, the importance in the visibility of a displayed image is high even if the point of gaze is detected at a position outside the virtual video 7001 (Z is false). Thus, the video determination processing unit 1009 commands the control unit 1003 to employ the processing C.

Figure 10A:
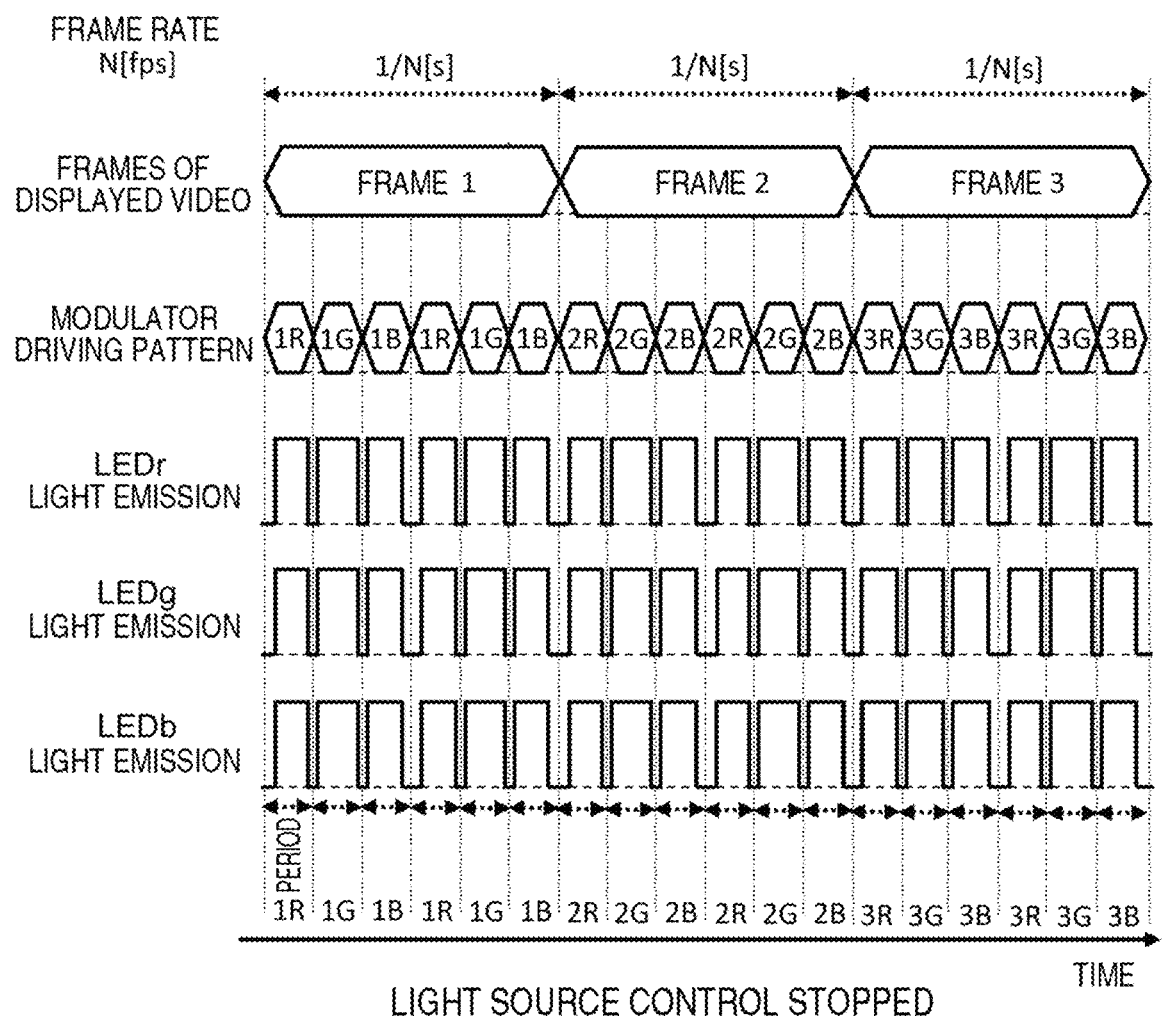
FIG. 10A is a timing chart illustrating an example of a light source control stop operation of the video display unit in the video display device 10.

(3) The display method illustrated in FIG. 10A may be employed as the display method of the video display unit 1001. In the display method illustrated in FIG. 10A, the driving speed is double-speed as in FIG. 4B, and light-source control is stopped so that the light emission periods of the red LED 3001, the green LED 3002, and the blue LED 3003 of the light source element 2003 are substantially synchronized. Thereby, light from the three LEDs are mixed in color, and the device user 20 recognizes the video as a black and white image, so that color breakup does not occur in principle. In FIG. 5, this may be applied to the processing C or D of FIG. 5 since the processing C and the processing D are employed when there is a high need to pay consideration to the discomfort that may be caused by the video.

Figure 10B:
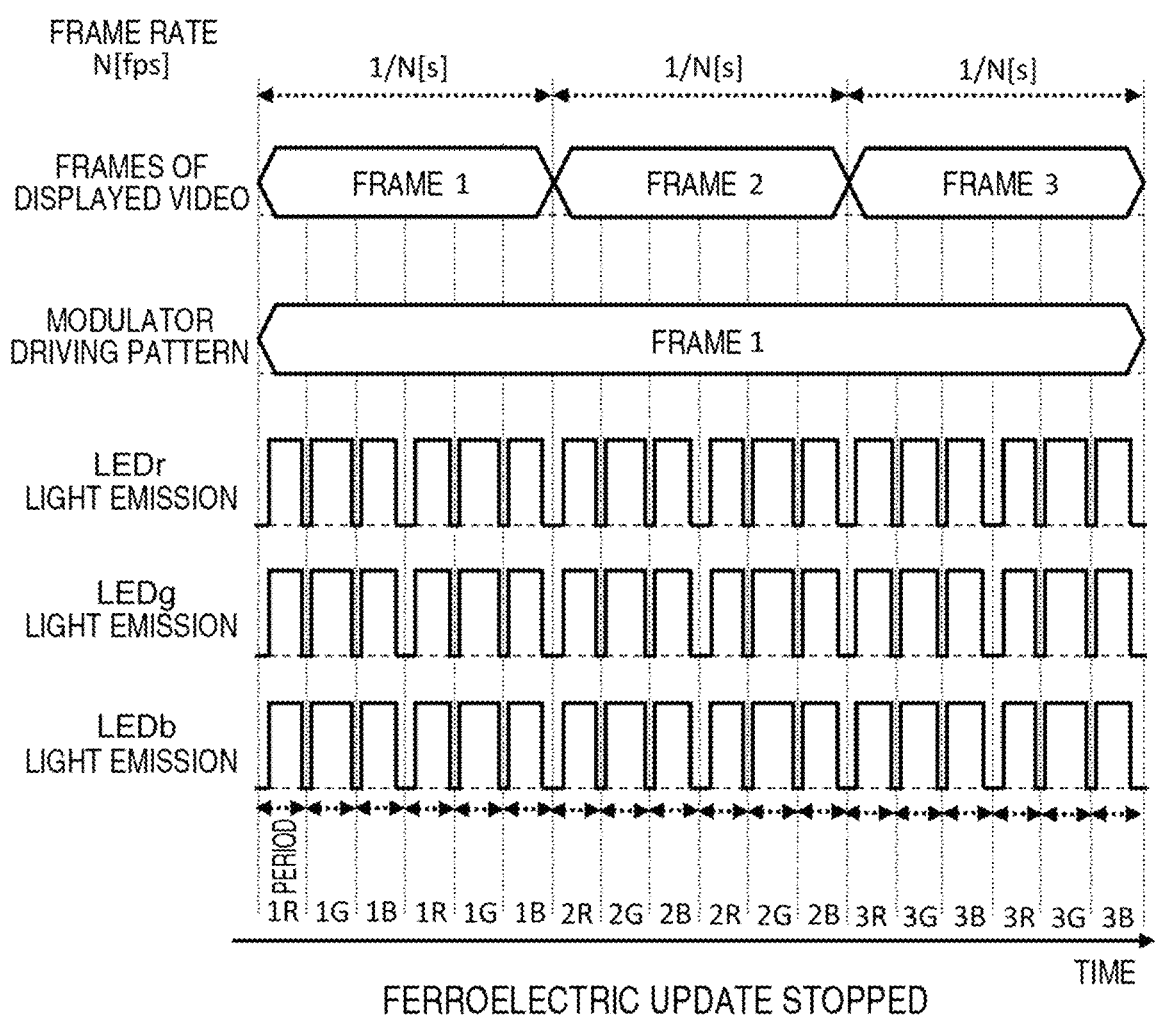
FIG. 10B is a timing chart illustrating an example of a ferroelectric liquid crystal update stop operation of the video display unit in the video display device 10.

Further, when images in video information in a plurality of successive frames are substantially the same, frame update by the modulator 2005 may be stopped. For example, as in FIG. 10B, when frames 1, 2, and 3 are substantially the same images, the modulator 2005 keeps displaying the same frame 1 for the period corresponding to these frames.

Cases where images are substantially the same include: a case where, when video information can be represented as, for example, H×V pieces of pixel information (both H and V are positive integers), the number of pixels that are changed in information between successive frames is sufficiently smaller than the value H×V; and a case where, when color information on each pixel can be represented by R, G, and B primary color information (e.g., R, G, and B are all positive integers between 0 to 255), changes in R, G, and B values between successive frames are sufficiently small.

Thereby, image flickers can be reduced. Further, when the modulator 2005 uses ferroelectric liquid crystals, to display the same frame a plurality of times consumes power for deletion and re-display of information. Stopping frame update by the modulator 2005 leads to a further reduction of power consumption. This may be applied to the processing C and the processing D in FIG. 5.

(4) The video information source 1007 may be configured to externally acquire video information. For example, the video information source 1007 may be a receiver conforming to video transmission standards such as DVI, HDMI (registered trademark), or Display Port, a receiver employing a general method for electric signal transmission, such as SPI, I2C, RS232, or USB, a receiver of a wired network such as Ethernet (registered trademark), or a receiver of a wireless network such as a wireless LAN or Bluetooth (registered trademark).

The video information source 1007 may include a decoder that receives and expands compressed information to obtain video information, or may include a function to receive and decrypt encrypted video information.

(5) The power supply unit 1012 supplies power to the video display device 10. As a power source, the power supply unit 1012 includes at least one of a rechargeable battery that can be charged by an external power source, a power source circuit that takes a desired amount of power out from a replaceable primary battery, a converter that connects to an external power source such as an electrical outlet to take a predetermined amount of power therefrom, a power stabilization circuit. Further, the power supply unit 1012 may include, in addition to the power source, an integrated circuit for power control to control charging and supplying power and to monitor the power source.

The control unit 1003 acquires information on the level of power remaining in the power source from the power supply unit 1012, and performs control such that the video processing unit 1008 performs video processing only when the remaining power level exceeds a predetermined value.

The control unit 1003 may also be configured to be able to change the display method of the video display unit 1001 to shorten the display intervals only when the level of power remaining in the power supply unit 1012 exceeds a predetermined value.

The control unit 1003 may also be configured to change the display method of the video display unit 1001 to extend the display intervals when the level of power remaining in the power supply unit 1012 falls below a predetermined value.

Embodiment 2

Figure 13:
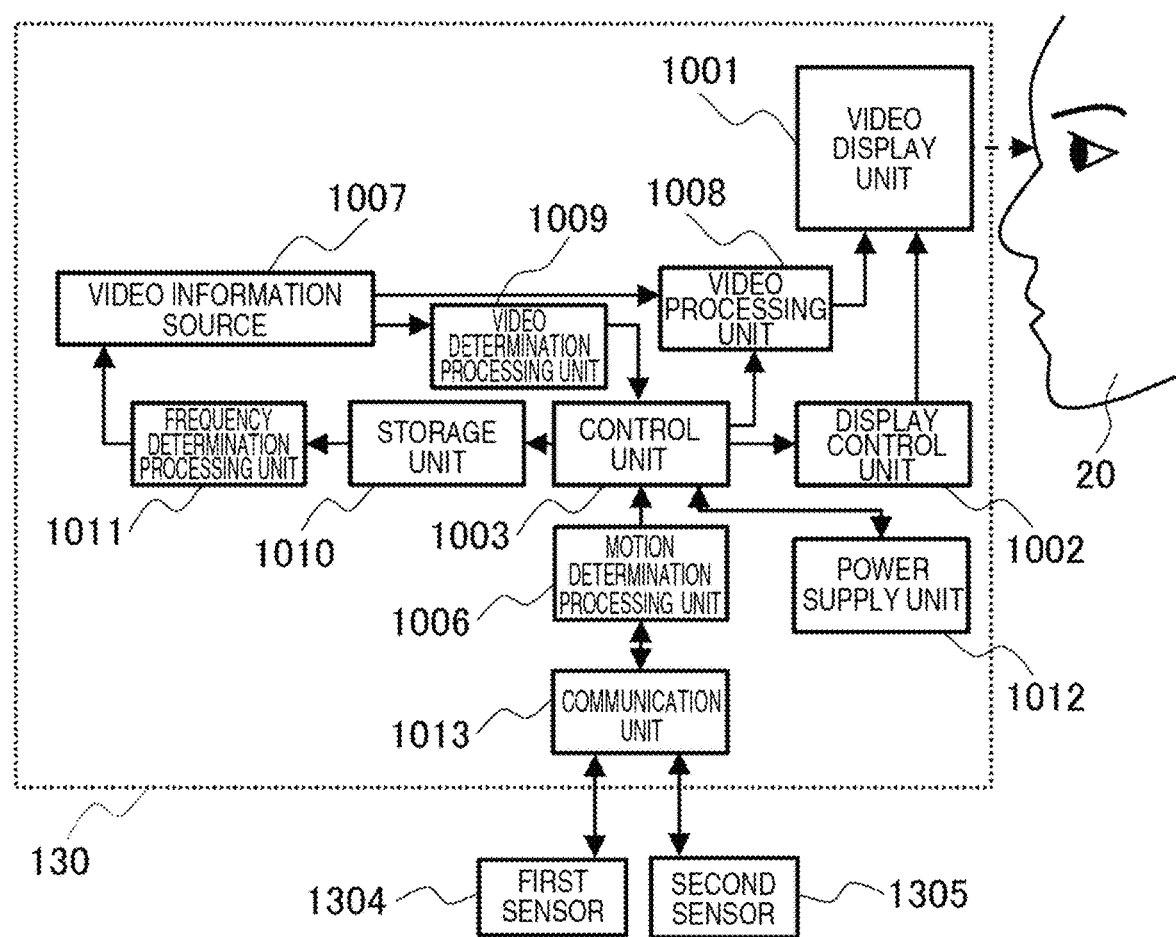
FIG. 13 is a block diagram illustrating a video display device 130 according to Embodiment 2.

FIG. 13 is a diagram illustrating Embodiment 2. Only points different from those in FIG. 1 are described.

A first sensor 1304 and a second sensor 1305 are provided separately from the casing of a video display device 130. Each of the sensors detects an action of the device user 20, as the sensors in Embodiment 1 do.

In the present embodiment, the first sensor 1304 and the video display device 130 exchange information via a communication unit 1013. The communication unit 1013 and the first sensor 1304 may communicate with each other using electrical signals on a conductor physically connecting them to each other, or may communicate via a wireless communication such as a wireless LAN, a Bluetooth (registered trademark), or Zigbee (registered trademark). The first sensor 1304 may include a communication unit (not shown). To use a wireless communication, the first sensor 1304 may be supplied with power from a power source different from the one for the video display device 130.

Like the first sensor 1305, the second sensor 1305 may exchange information with the communication unit 1013 using the wired or wireless communication described above. The second sensor 1305 may include a communication unit (not shown). Further, to use a wireless communication, the second sensor 1305 may be supplied with power from a power source different from the one for the video display device 130.

The motion determination processing unit 1006 receives an output from the first sensor 1304 and an output from the second sensor 1305 via the communication unit 1013.

Figure 14:
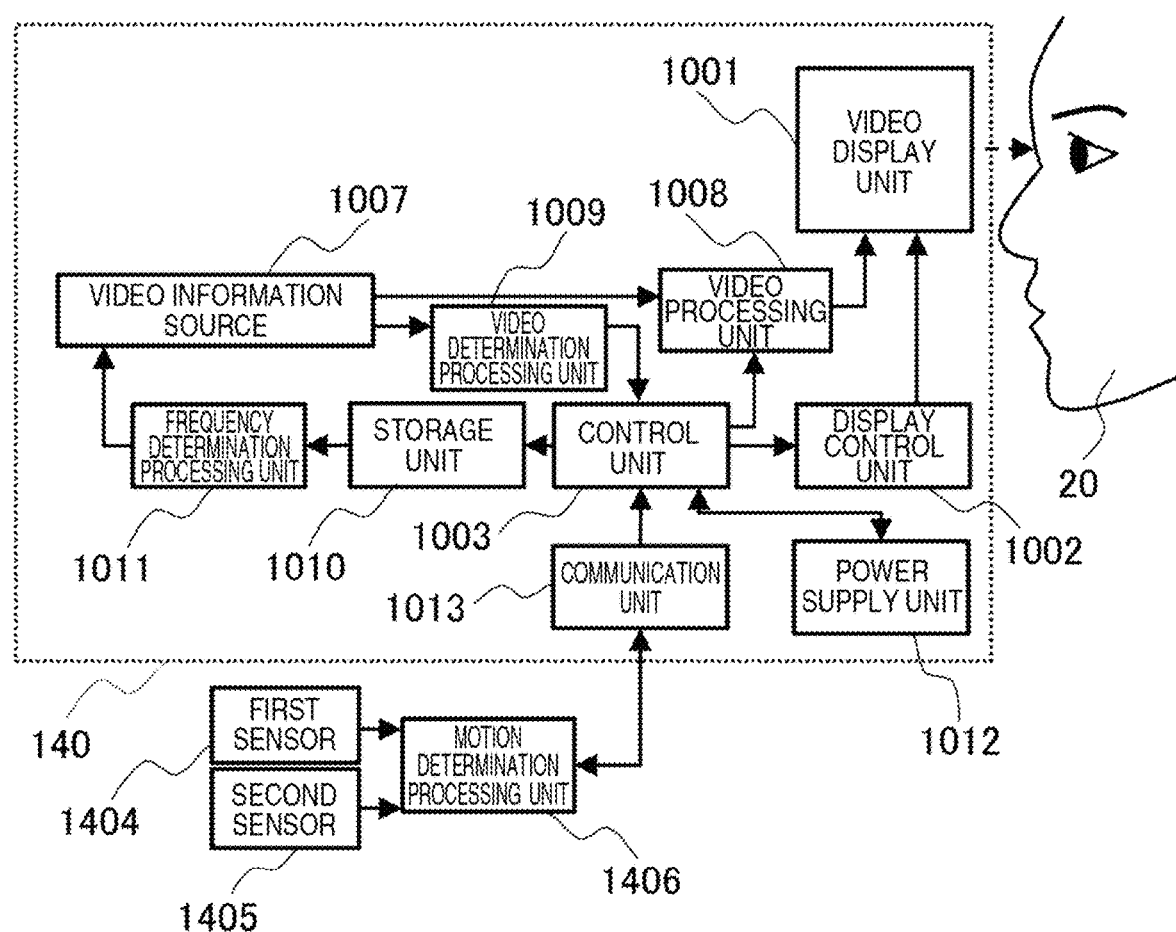
FIG. 14 is a block diagram illustrating a video display device 140 according to Embodiment 2.
Figure 15:
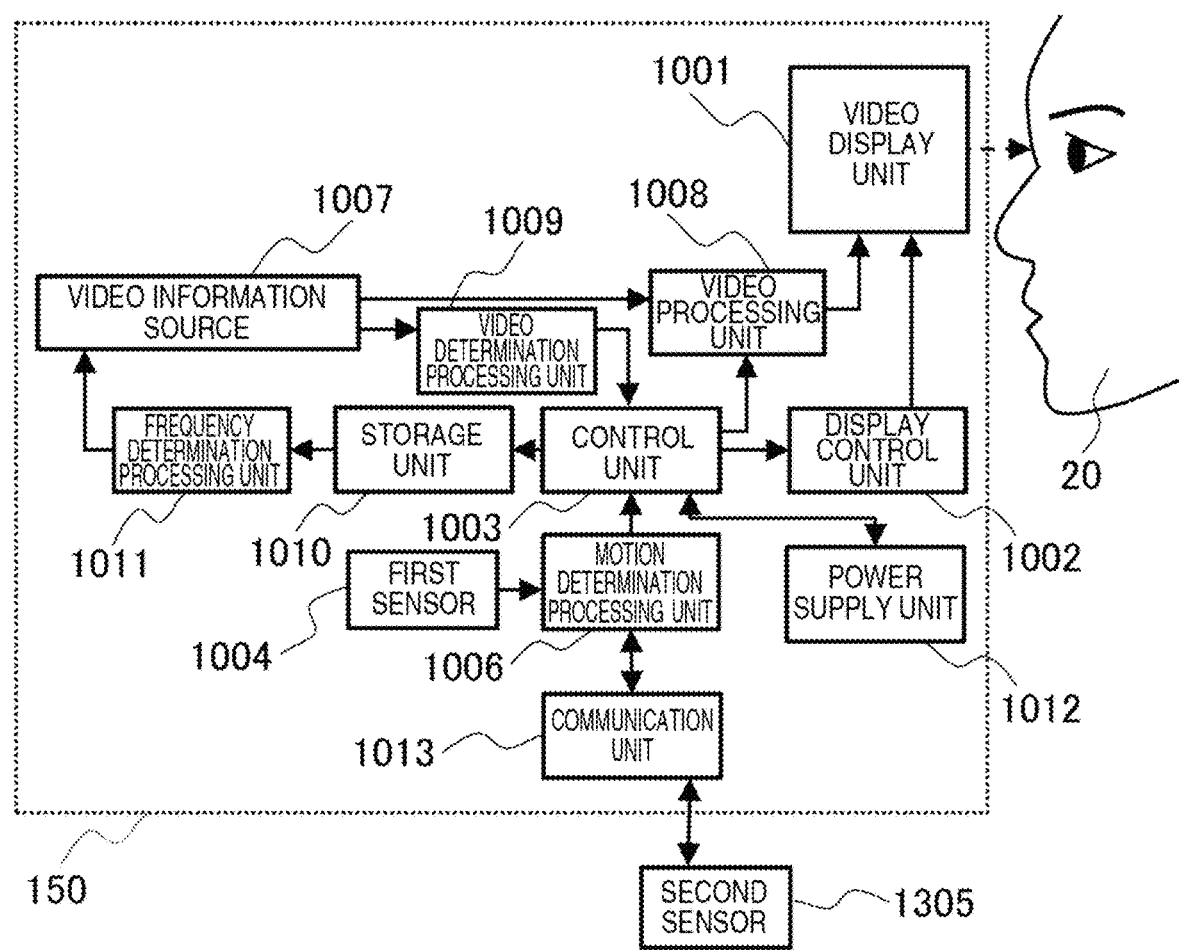
FIG. 15 is a block diagram illustrating a video display device 150 according to Embodiment 2.

FIGS. 14 and 15 are modifications of the present embodiment.

In the modification illustrated in FIG. 14, a first sensor 1404, a second sensor 1405, and a motion determination processing unit 1406 are provided separately from the casing of a video display device 140. The motion determination processing unit 1406 and the control unit 1003 exchange information via the communication unit 1013 using the wired or wireless communication described above. The first sensor 1404, the second sensor 1405, and the motion determination processing unit 1406 may be contained in the same casing. Further, the motion determination processing unit 1406 may include a communication unit (not shown).

In the modification illustrated in FIG. 15, the second sensor 1305 is provided separately from a video display device 150. The second sensor 1305 and the motion determination processing unit 1006 may exchange information via the communication unit 1013 using a wired or wireless communication as described above.

The separately-provided first sensor 1304 and second sensor 1305 do not need to be worn by the device user 20. The first sensor 1304 and the second sensor 1305 only have to detect a movement of the head of the device user 20, a movement of an eye, and the like, and may be, for example, sensors using a camera and image processing. Such a case includes a situation where the device user 20 is at a fixed location and performs certain work by viewing a video, with the first sensor 1304 and the second sensor 1305 in camera forms being placed on the working table.

In a case where the device user 20 uses the video display device 130, the video display device 140, or the video display device 150 with the device user 20 standing up or sitting down in a fixed position, a detection sensor such as a pressure distribution measurement device that measures the displacement of the center of gravity may be provided under the device user 20 and used as the first sensor 1304 or the second sensor 1305.

Embodiment 3

Figure 16:
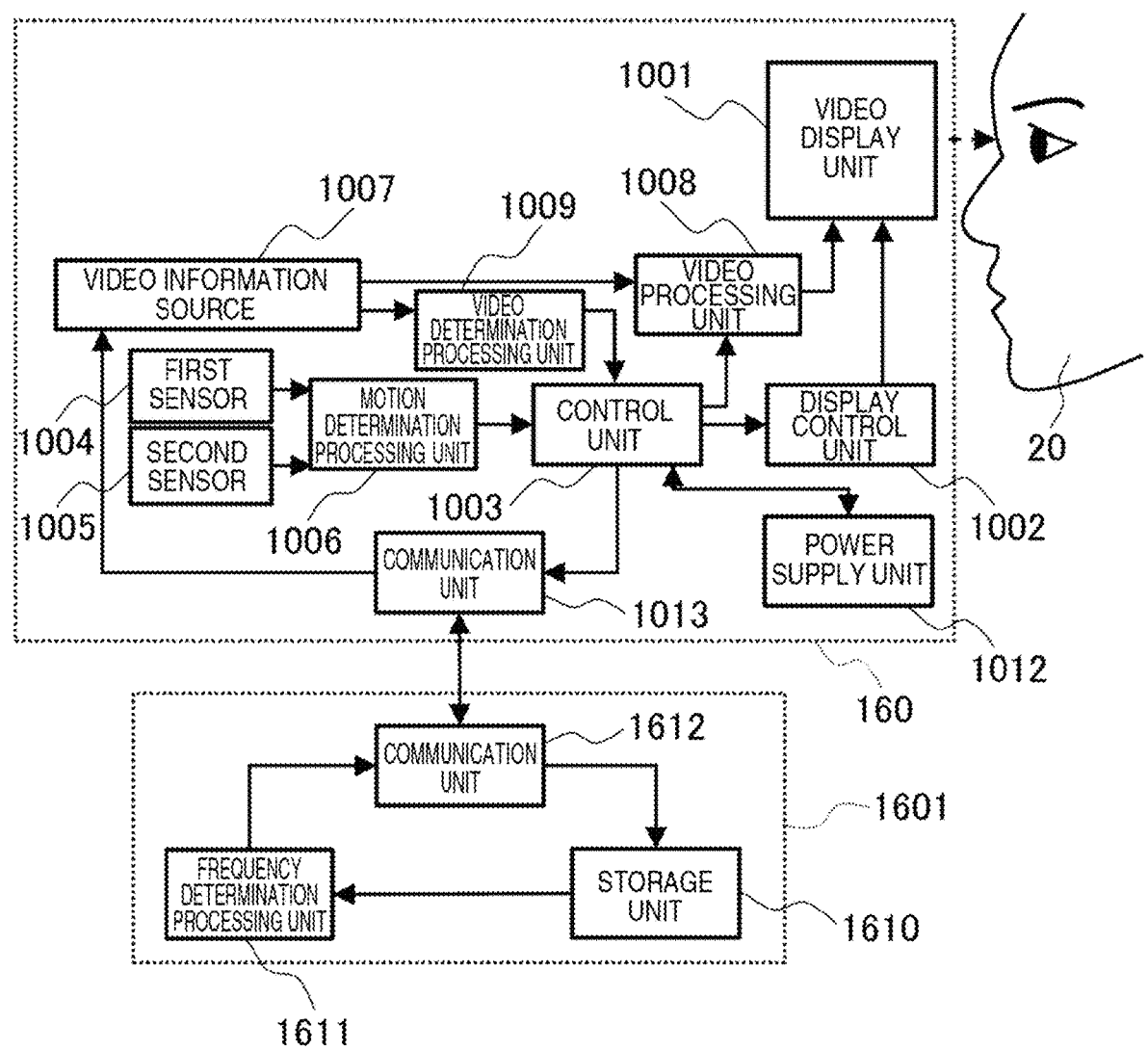
FIG. 16 is a block diagram illustrating a video display device 160 according to Embodiment 3.

FIG. 16 is a diagram illustrating Embodiment 3. Only points different from those in FIG. 1 are described.

In the present embodiment, a storage unit 1610 and a frequency determination processing unit 1611 are provided in a server 1601 separately from a video display device 160. The storage unit 1610 and the frequency determination processing unit 1611 operate in the same manners as the storage unit 1010 and the frequency determination processing unit 1011 in Embodiment 1 do.

The storage unit 1310 and the control unit 1003 exchange information via the communication unit 1013 of the video display device 160 and a communication unit 1612 of the server 1601, and the communication unit 1013 and the communication unit 1612 may communicate using electric signals on a conductor physically connecting them to each other, or may be performed via a wireless communication such as a wireless LAN, Bluetooth (registered trademark), or Zigbee (registered trademark).

Similarly, the frequency determination processing unit 1611 and the video information source 1007 may exchange information via the communication unit 1013 and the communication unit 1612 using a wired or wireless communication as described above.

Figure 17:
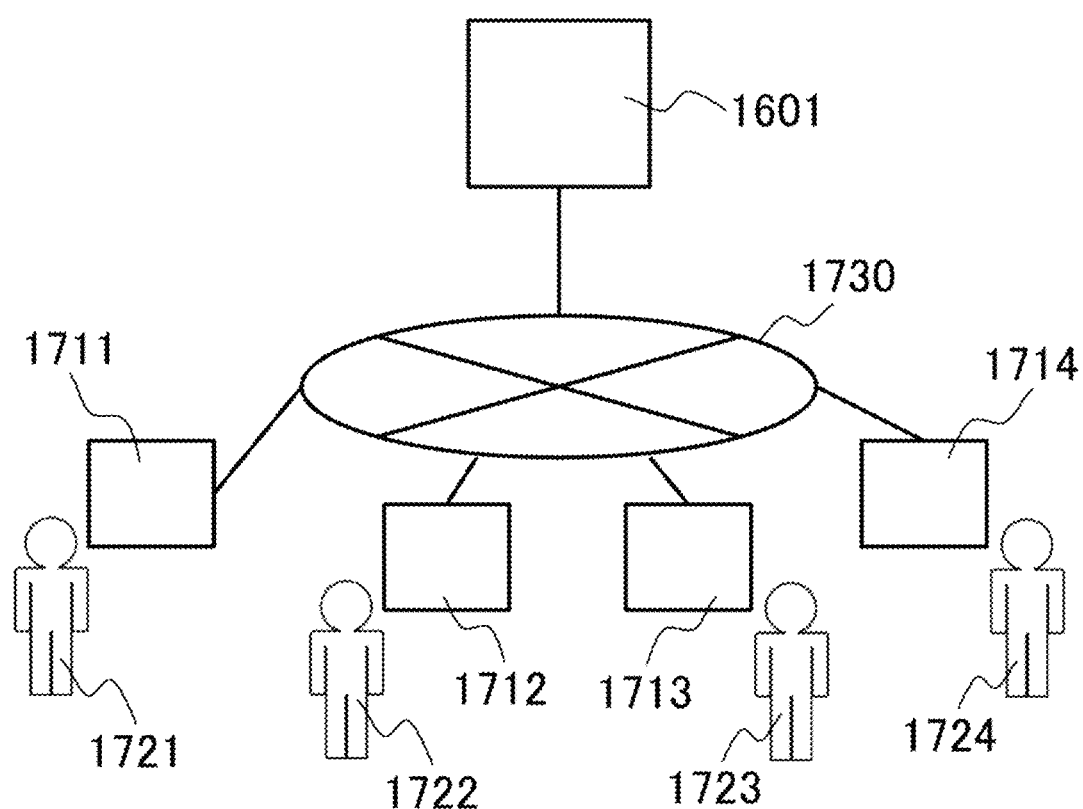
FIG. 17 is a block diagram illustrating an example of how video display devices according to Embodiment 3 are controlled.

FIG. 17 illustrates a control method for a system including a plurality of video display devices 160. Each of a first video display device 1711, a second video display device 1712, a third video display device 1713, and a fourth video display device 1714 can communicate with the server 1601 via a network 1730.

The first video display device 1711 is used by a first user 1721, the second video display device 1712 is used by a second user 1722, the third video display device 1713 is used by a third user 1723, and the fourth video display device 1714 is used by a fourth user 1724.

The first video display device 1711, the second video display device 1712, the third video display device 1713, and the fourth video display device 1714 have the same capabilities as the video display device 160.

The server 1601 has the storage unit 1610 and the frequency determination processing unit 1611, and when the display method of the video display unit 1001 is changed or when the processing method of the video processing unit 1008 is changed, receives a history and a time of the change from the control unit 1003 of a corresponding one of the first video display device 1711, the second video display device 1712, the third video display device 1713, and the fourth video display device 1714 via the network 1730.

The server 1601 extracts information common in the pieces of change information transmitted from the respective video display devices, and the frequency determination processing unit 1611 requests the video information sources 1007 to change video information when processing recorded in the storage units 1610 and common in the video display devices exceeds a predetermined number of times within a predetermined period of time. To change video information is to change parameters such as image contrast, sharpness, saturation, hue, or image brightness.

The number of video display devices 160 connected to the network 1730 is not limited to the number shown in the present embodiment. At least one video display device 160 only needs to be connected.

Although the present invention has been described using the embodiments, the present invention is not limited to those embodiments and, as it is apparent to those skilled in the art, can be changed and altered variously without departing from the spirit of the present invention and the scope of the appended claims.

REFERENCE SIGNS LIST 10 video display device
1001 video display unit
1002 display control unit
1003 control unit
1004 first sensor
1005 second sensor
1006 motion determination processing unit
1007 video information source
1008 video processing unit
1009 video determination processing unit
1010 storage unit
1011 frequency determination processing unit
1012 power supply unit
1013 communication unit
1020 controller
20 device user
2001 video signal processing unit
2002 light source element power supply control unit
2003 light source element
2004 light source driver
2005 modulator
2006 modulator driver
2007 projection unit
2008 settings control unit
3001 red LED
3002 green LED
3003 blue LED
3004,3005,3006 current limiting resistance
7001 virtual video
1101 sensor A
1102 sensor B
1103 detection control unit
1111 eye
1112, 1113 light emitter
1114, 1115 light receiver
1116 comparator
1117, 1118 camera
1119 current control unit
1120 movement detection processing unit
1121 idleness control unit
1201 virtual video
1202 virtual display video
130 video display device
1304 first sensor
1305 second sensor
140 video display device
1404 first sensor
1405 second sensor
1406 motion determination processing unit
150 video display device
160 video display device
1601 server
1610 storage unit
1611 frequency determination processing unit
1612 communication unit
1711 first video display device
1712 second video display device
1713 third video display device
1714 fourth video display device
1721 first user
1722 second user
1723 third user
1724 fourth user
1730 network

The invention claimed is:

1. A video display device wearable on a head of a user, comprising:
a video display configured to switch a frame rate of a video displayed thereon;
a controller configured to control a designation of the frame rate for the video display;
a first sensor configured to detect a movement of the head of the user;
a second sensor configured to detect a movement of a line of sight of the user; and
a motion determination processor configured to determine a motional state of the user of the device based on an output from the first sensor and an output from the second sensor,
wherein the video display is configured to display a virtual video,
wherein the controller is configured to:
upon the motion determination processor determining that at least one of the movement of the head and the movement of the line of sight of the user is detected, increase the frame rate of the video displayed on the video display,
upon determining the line of sight of the user is on the virtual video, display the virtual video without changing the video by processing of a contrast and a brightness of the video, and
upon determining the line of sight of the user is not on the virtual video, decrease the contrast and the brightness of the video.

2. The video display device according to claim 1, wherein the video display is a liquid crystal element or a mirror array element, and
the video display is further configured to switch an interval for updating information on pixels thereof and an interval for driving a light source thereof.

3. The video display device according to claim 2, wherein the video display is further configured to change at least one of video parameters which are contrast, sharpness, saturation, hue, and image brightness,
wherein the controller is further configured to instruct the video display unit to change at least one of the contrast, the sharpness, the saturation, the hue, and the image brightness according to a result of the determination made by the motion determination processor.

4. The video display device according to claim 2, wherein motion determination processor is configured to determine the motional state of user which includes:
whether there is the movement of the head of the user, whether there is the movement of the line of sight of the user, whether a viewpoint of the user is on the video being displayed by the video display, and whether the movement of the head and the movement of the line of sight match each other.

5. The video display device according to claim 4, wherein the controller is further configured to:
extend at least one of the interval for updating information on the pixels of the video display and the interval for driving the light source of the video display according to the movement of the line of sight of the user being relatively larger than the movement of the head of the user, and
lower at least one of the contrast and the brightness of the video when the viewpoint of the user is not on the video being displayed by the video display.

6. The video display device according to claim 4, wherein the motion determination processor is further configured to:
transform a first output vector from the first sensor and a second output vector from the second sensor into two-dimensional vectors by orthographically projecting the first and second output vectors onto a video display plane, and
determine that the movement of the head and the movement of the line of sight match in direction when an angle between the two transformed two-dimensional vectors falls below a prescribed value.

7. The video display device according to claim 1, wherein the video display is further configured to change video parameters of the video display including at least one of contrast, sharpness, saturation, hue, and image brightness,
wherein the controller is further configured to instruct the video display unit to change at least one of the contrast, the sharpness, the saturation, the hue, and the image brightness according to a result of the determination made by the motion determination processor.

8. The video display device according to claim 1, further comprising:
a storage unit that stores one or more changes of the video parameters instructed by the controller; and
a frequency determination unit that determines contents of the changes stored in the storage unit and a number of times the changes has been made within a prescribed period of time,
wherein the frequency determination unit notifies a video information source of the change of the video parameter that has been changed more than a predetermined number of times within the prescribed period of time.

9. The video display device according to claim 1, wherein the first sensor is one of a gyro sensor, an acceleration sensor, a geomagnetic sensor, a GPS, and a camera.

10. The video display device according to claim 1, wherein the controller is further configured to:
acquire information on an amount of power remaining in a power source and limit the change of the frame rate of the video display according to the amount of power remaining in the power source.

11. The video display device according to claim 1, wherein the motion determination processor is further configured to determine that the movement of the head or the movement of the line of sight of the user is detected upon determining:
a duration of time of the movement of the head or the movement of the line of sight of the user by the first or second sensor exceeds a predetermined amount of time,
a speed of the movement of the head or the movement of the line of sight of the user exceeds a predetermined speed, and
a displacement of the movement of the head or the movement of the line of sight of the user exceeds a predetermined displacement.

12. The video display device according to claim 1,
wherein the light source is at least three light emitting diodes (LED) of different colors, and
wherein the controller is configured to control the at least three LEDs to display the virtual video as the black and white image.

* * * * *